(12) United States Patent
Blom et al.

(10) Patent No.: US 9,784,241 B2
(45) Date of Patent: Oct. 10, 2017

(54) SYSTEM AND METHOD FOR CONTROLLING A WIND TURBINE

(71) Applicant: General Electric Company, Schenectady, NY (US)

(72) Inventors: Rogier Sebastiaan Blom, Ballston Lake, NY (US); Matthijs Leonardus Gerardus Boerlage, Greenville, SC (US); Nora Cheng-Huei Han, Bavaria (DE)

(73) Assignee: General Electric Company, Niskayuna, NY (US)

( * ) Notice: Subject to any disclaimer, the term of this patent is extended or adjusted under 35 U.S.C. 154(b) by 511 days.

(21) Appl. No.: 14/467,956

(22) Filed: Aug. 25, 2014

(65) Prior Publication Data

US 2016/0053745 A1    Feb. 25, 2016

(51) Int. Cl.
*F03D 7/04* (2006.01)
*F03D 7/02* (2006.01)

(52) U.S. Cl.
CPC ........... *F03D 7/045* (2013.01); *F03D 7/0224* (2013.01); *F03D 7/0264* (2013.01);
(Continued)

(58) Field of Classification Search
CPC ....... F03D 7/045; F03D 7/0024; F03D 7/0264
(Continued)

(56) References Cited

U.S. PATENT DOCUMENTS 4,189,648 A * 2/1980 Harner ................. F03D 7/0224
290/44
4,193,005 A * 3/1980 Kos ....................... F03D 7/0224
290/44
(Continued)

FOREIGN PATENT DOCUMENTS

EP         1612413 A2      1/2006

OTHER PUBLICATIONS

Jelavic (Mate Jelavic, Individual pitch control of wind turbine based on loads estimation, 978-1-4244-1766—Jul. 2008, 2008 IEEE, University of Zagreb).*
(Continued)

*Primary Examiner* — Sean Shechtman
*Assistant Examiner* — Michael W Choi
(74) *Attorney, Agent, or Firm* — Pabitra K. Chakrabarti

(57) ABSTRACT

A wind turbine includes a rotor, a plurality of rotor blades coupled to the rotor, and a blade pitch control system coupled to each rotor blade. A computer-implemented method for controlling the wind turbine includes determining at least one pitch position for a first blade. The method also includes determining whether there is a malfunction of the blade pitch control system associated with the first blade. The method further includes predicting a rotor imbalance using a model of at least a portion of the wind turbine. The method also includes comparing the predicted rotor imbalance with a predetermined threshold value. The method further includes one of regulating the pitch position for the second blade such that the predicted rotor imbalance is
(Continued)

restored to a value below the predetermined threshold and regulating a pitch position for a second blade such that the predicted rotor imbalance does not exceed the predetermined threshold.

23 Claims, 10 Drawing Sheets

(52) U.S. Cl.
CPC ..... *F05B 2260/74* (2013.01); *F05B 2260/821* (2013.01); *F05B 2260/84* (2013.01); *F05B 2270/107* (2013.01); *F05B 2270/309* (2013.01); *F05B 2270/32* (2013.01); *F05B 2270/326* (2013.01); *F05B 2270/327* (2013.01); *F05B 2270/328* (2013.01); *F05B 2270/404* (2013.01); *Y02E 10/723* (2013.01)

(58) Field of Classification Search
USPC .......................................................... 700/287
See application file for complete search history.

(56) References Cited

U.S. PATENT DOCUMENTS

| | | | |
|---|---|---|---|
| 4,426,192 A * | 1/1984 | Chertok | F03D 7/0224 416/1 |
| 4,435,647 A * | 3/1984 | Harner | F03D 7/0224 290/44 |
| 6,619,918 B1 | 9/2003 | Rebsdorf | |
| 7,874,797 B2 * | 1/2011 | Pierce | F03D 1/008 416/1 |
| 7,891,944 B2 | 2/2011 | Jeppesen et al. | |
| 7,944,067 B2 | 5/2011 | Kammer et al. | |
| 8,096,762 B2 | 1/2012 | Risager et al. | |
| 8,123,477 B2 * | 2/2012 | Risager | F03D 7/0224 416/1 |
| 8,217,524 B2 | 7/2012 | Nakashima et al. | |
| 8,240,990 B2 | 8/2012 | Kammer et al. | |
| 2006/0002793 A1 * | 1/2006 | Yoshida | F03D 7/0212 416/11 |
| 2006/0113801 A1 * | 6/2006 | Schubert | F03D 1/003 290/44 |
| 2008/0069692 A1 * | 3/2008 | Oohara | F03D 7/0224 416/31 |
| 2009/0004005 A1 * | 1/2009 | Jeppesen | F03D 7/0224 416/44 |
| 2010/0045038 A1 * | 2/2010 | Skaare | F03D 7/0224 290/44 |
| 2010/0133828 A1 * | 6/2010 | Stegemann | F03D 7/0204 290/44 |
| 2011/0178771 A1 * | 7/2011 | Miranda | F03D 7/0224 702/182 |
| 2011/0193343 A1 | 8/2011 | Nakashima et al. | |
| 2011/0229300 A1 * | 9/2011 | Kanev | F03D 7/0224 415/1 |
| 2012/0093645 A1 * | 4/2012 | Haag | F03D 7/0224 416/1 |
| 2012/0128488 A1 * | 5/2012 | Kristoffersen | F03D 7/0224 416/31 |
| 2012/0134813 A1 | 5/2012 | Nies et al. | |
| 2012/0139240 A1 | 6/2012 | Otamendi Claramunt et al. | |
| 2012/0183399 A1 * | 7/2012 | Perkinson | F03D 7/0224 416/1 |
| 2013/0214535 A1 * | 8/2013 | Brath | F03D 7/0264 290/44 |
| 2013/0230400 A1 * | 9/2013 | Gao | F03D 7/0224 416/1 |
| 2013/0259686 A1 | 10/2013 | Blom et al. | |
| 2014/0178195 A1 | 6/2014 | Blom et al. | |

OTHER PUBLICATIONS

International Search Report and Written Opinion issued in connection with corresponding PCT Application No. PCT/US2015/045847 dated Oct. 30, 2015.

Thomsen et al., "Attenuating Wind Turbine Loads Through Model Based Individual Pitch Control", Proceedings of Nordic Wind Power Conference, 2009.

Xiukun Wei et al., "Sustainable Control, a New Approach to Operate Wind turbines", Dutch Wind Workshops, pp. 1-21, Oct. 2010.

Dunne et al., "Adding Feedforward Blade Pitch Control for Load Mitigation in Wind Turbines: Non-Causal Series Expansion, Preview Control, and Optimized FIR Filter Methods", American Institute of Aeronautics and Astronautics, pp. 1-17, Jan. 2011.

* cited by examiner

SYSTEM AND METHOD FOR CONTROLLING A WIND TURBINE

BACKGROUND

The field of the disclosure relates generally to wind turbines, and more particularly to a system and method for controlling wind turbines to reduce load imbalances under certain operating conditions, e.g., blade-pitch failure.

Many known wind turbines are used to generate power by harnessing wind energy present in the environment. During operation, such wind turbines may experience various fault conditions. Some of the fault conditions may be rectified while the wind turbine is in operation and some of the fault conditions may require the wind turbine to shut down. Once a shutdown command is generated by a wind turbine controller, the wind turbine initiates a standard process to shut down the wind turbine. During the standard process of shutting down the wind turbine, undesirable loads are induced in some of the wind turbine components that lead to accelerated wear and a possible shortening of the service life of such components. Specifically, the process of shutdown leads to high mechanical loads in wind turbine components such as a hub, a tower and a foundation of the wind turbine.

Furthermore, failure of a blade pitch system in the wind turbine or a deviation of a blade pitch angle from a determined set point during the process of shutdown may amplify the undesirable loads in the wind turbine. Currently, various approaches have been employed to address the issue of undesirable loads generated in the wind turbine. One such approach is to use mechanical brakes positioned on a generator shaft to shut down the wind turbine. However, using mechanical brakes leads to higher maintenance costs due to the accelerated wear of the mechanical brake components.

Another conventional approach is to use an open loop control technique to shut down the wind turbine that includes pitching out the wind turbine blades from an operating position to a feathered parking position using a fixed, pre-defined pitch-out profile. Unfortunately, this technique entails specific manual tuning and optimization of control parameters for each unique wind turbine configuration. Moreover, a single pitch-out profile is employed to control the wind turbine blades at different initial pitch angles and varying wind conditions during the shutdown, thereby resulting in inefficiencies and a suboptimal performance of the wind turbine.

BRIEF DESCRIPTION

In one aspect, a computer-implemented method for controlling a wind turbine is provided. The wind turbine includes a rotor, a plurality of rotor blades coupled to the rotor, and a blade pitch control system coupled to each rotor blade of the plurality of rotor blades. The method includes determining at least one pitch position for at least one first rotor blade of the plurality of rotor blades. The method also includes determining whether there is a malfunction of a portion of the blade pitch control system associated with the at least one first rotor blade. The method further includes predicting a rotor imbalance using a model of at least a portion of the wind turbine. The method also includes comparing the predicted rotor imbalance with a predetermined threshold value. The method further includes regulating the at least one pitch position for the at least one second rotor blade of the plurality of rotor blades such that the predicted rotor imbalance is restored to a value below the predetermined threshold value and regulating at least one pitch position for at least one second rotor blade of the plurality of rotor blades such that the predicted rotor imbalance does not exceed the predetermined threshold value.

In another aspect, a system for controlling a wind turbine is provided. The wind turbine includes a rotor and a plurality of rotor blades coupled to the rotor. The system includes a blade pitch control system coupled to the plurality of rotor blades. The blade pitch control system is configured to position the plurality of rotor blades based on a commanded pitch angle and determine whether there is a malfunction of a portion of said blade pitch control system associated with at least one first rotor blade of the plurality of rotor blades. The system also includes one of two imbalance control sub-systems coupled to the blade pitch control system. The system includes a first model-based imbalance control sub-system coupled to the blade pitch control system. The first model-based imbalance control sub-system includes at least one first processor configured to regulate the at least one pitch position for the at least one second rotor blade of the plurality of rotor blades such that the predicted rotor imbalance is restored to a value below the predetermined threshold value. Otherwise, the system includes a second model-based imbalance control sub-system coupled to said blade pitch control system. The second model-based imbalance control sub-system includes at least one second processor configured to regulate at least one pitch position for at least one second rotor blade of the plurality of rotor blades such that the predicted rotor imbalance does not exceed a predetermined threshold value.

In a further aspect, a wind turbine is provided. The wind turbine includes a rotor and a plurality of rotor blades coupled to the rotor. Each rotor blade of the plurality of rotor blades defines a pitch axis and is configured to attain a position having a pitch angle about the pitch axis. The wind turbine also includes a blade pitch control system coupled to the plurality of rotor blades. The blade pitch control system is configured to position the plurality of rotor blades based on a commanded pitch angle and determine whether there is a malfunction of a portion of the blade pitch control system associated with at least one first rotor blade of the plurality of rotor blades. The system also includes one of two imbalance control sub-systems coupled to the blade pitch control system. The system includes a first model-based imbalance control sub-system coupled to the blade pitch control system. The first model-based imbalance control sub-system includes at least one first processor configured to regulate the at least one pitch position for the at least one second rotor blade of the plurality of rotor blades such that the predicted rotor imbalance is restored to a value below the predetermined threshold value. Otherwise, the system includes a second model-based imbalance control sub-system coupled to said blade pitch control system. The second model-based imbalance control sub-system includes at least one second processor configured to regulate at least one pitch position for at least one second rotor blade of the plurality of rotor blades such that the predicted rotor imbalance does not exceed a predetermined threshold value.

DRAWINGS

These and other features, aspects, and advantages of the present disclosure will become better understood when the following detailed description is read with reference to the accompanying drawings in which like characters represent like parts throughout the drawings, wherein.

Figure 1:
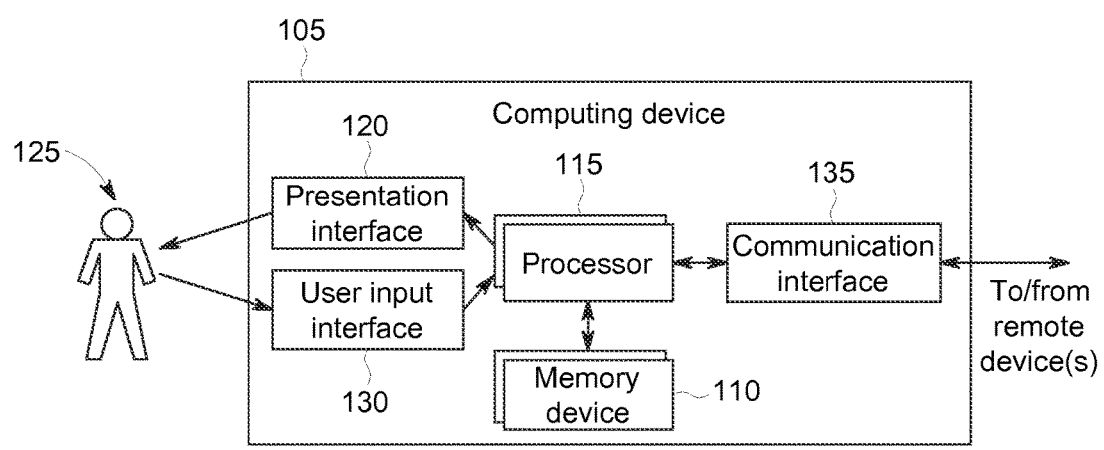
FIG. 1 is a block diagram of an exemplary computing device.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer", and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The wind turbine control systems described herein provide a method for inducing control of the wind turbine to significantly reduce a potential for rotor imbalance and the associated mechanical load excursions subsequent to a malfunction in a blade pitch control mechanism. Specifically, the embodiments described herein include a rotor imbalance control sub-system that facilitates predicting a rotor imbalance using a physics-based model of at least a portion of the wind turbine, comparing the predicted rotor imbalance with a predetermined threshold value, and regulating a pitch angle for the operable rotor blades such that the predicted rotor imbalance either is restored to within the parameters as soon as possible if the thresholds are exceeded, or does not exceed the predetermined threshold. More specifically, one of the embodiments described herein uses a gradient-based strategy to facilitate reducing rotor imbalances back within predetermined parameters to regulate loads that include hub flange resultant moments and tower top loads, e.g., yaw bearing nodding moments. Also, more specifically, another one of the embodiments described herein uses a model predictive control (MPC) strategy to facilitate maintaining rotor imbalances within predetermined parameters to regulate loads that include hub flange resultant moments and tower top loads, e.g., yaw bearing nodding moments. As such, the embodiments described herein reduce reliance on mechanical breaking systems to slow down the wind turbine rotor, thereby facilitating reducing wear on the mechanical breaking systems and reducing the associated increase in maintenance costs, or more robust design requirements.

FIG. 1 is a block diagram of an exemplary computing device 105 that may be used to regulate imbalanced loading of a wind turbine rotor (not shown in FIG. 1). More specifically, computing device 105 facilitates predicting a rotor imbalance using a gradient-based rotor imbalance control sub-system architecture, comparing a predicted rotor imbalance with a predetermined threshold value, and regulating a pitch angle, or pitch position for the operable rotor blades such that an actual rotor imbalance is returned to within parameters. Alternatively, computing device 105 facilitates predicting a rotor imbalance using a model predictive control-based (MPC-based) rotor imbalance control sub-system architecture, such that the predicted rotor imbalance does not exceed the predetermined threshold. Both rotor imbalance control sub-system architectures use a physics-based model representative of at least a portion of the wind turbine. Computing device 105 includes a memory device 110 and a processor 115 operatively coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. In the exemplary embodiment, memory device 110 is one or more devices that enable storage and retrieval of information such as executable instructions and/or other data. Memory device 110 may include one or more computer readable media.

Memory device 110 may be configured to store operational measurements including, without limitation, real-time and historical blade pitch values, rotor imbalance values, and/or any other type data. Also, memory device 110 includes, without limitation, sufficient data, algorithms, and commands to facilitate generating physics-based models of rotor imbalances associated with a wind turbine and use the models to generate wind turbine blade pitch commands accordingly with a gradient-based rotor imbalance control strategy. Further, memory device 110 includes, without limitation, sufficient data, algorithms, and commands to facilitate generating physics-based models of rotor imbalances associated with a wind turbine and use the models to predict the imbalances and generate wind turbine blade pitch commands accordingly with a model predictive control (MPC) strategy.

In some embodiments, computing device 105 also includes sufficient computer-readable/executable instructions, data structures, program modules, and program sub-modules, to receive other data associated with measured values from other wind turbine systems to facilitate overall operation of the wind turbine.

In some embodiments, computing device 105 includes a presentation interface 120 coupled to processor 115. Presentation interface 120 presents information, such as a user interface and/or an alarm, to a user 125. In some embodiments, presentation interface 120 includes one or more display devices. In some embodiments, presentation interface 120 presents an alarm associated with the wind turbine control system, such as by using a human machine interface (HMI) (not shown in FIG. 1). Also, in some embodiments, computing device 105 includes a user input interface 130. In the exemplary embodiment, user input interface 130 is coupled to processor 115 and receives input from user 125.

A communication interface 135 is coupled to processor 115 and is configured to be coupled in communication with one or more other devices, such as a sensor or another computing device 105, and to perform input and output operations with respect to such devices while performing as an input channel. Communication interface 135 may receive data from and/or transmit data to one or more remote devices. For example, a communication interface 135 of one computing device 105 may transmit an alarm to the communication interface 135 of another computing device 105. In some embodiments, communication interface 135 is a wireless interface.

Figure 2:
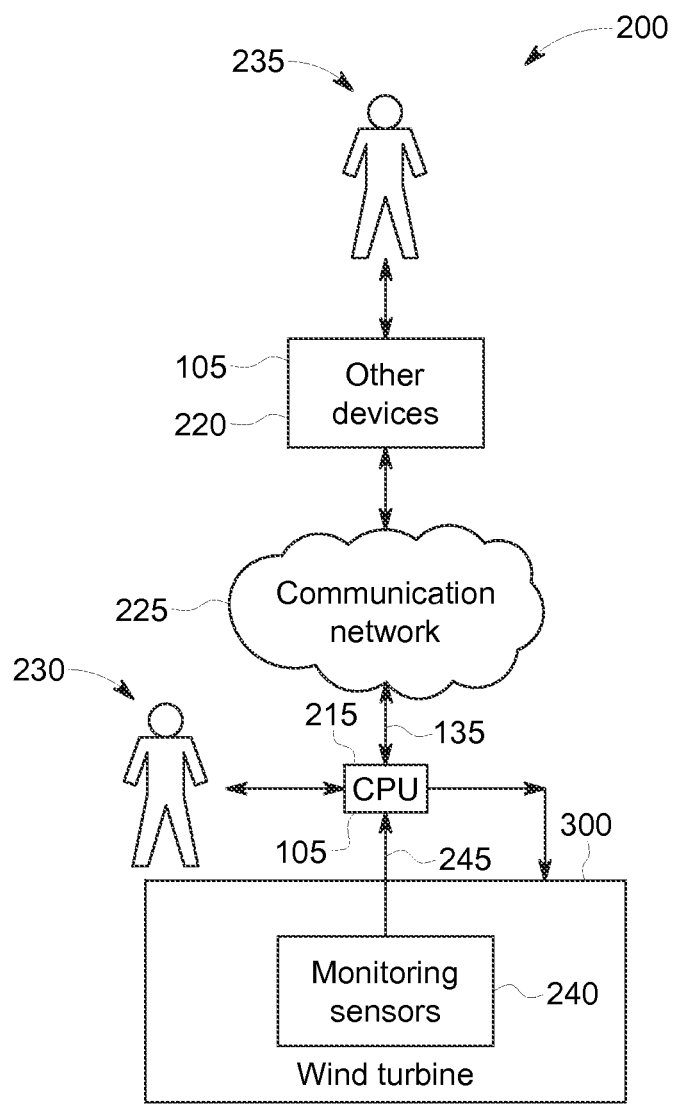
FIG. 2 is a block diagram of a portion of an exemplary wind turbine control system that may include the computing device shown in FIG. 1.

FIG. 2 is a block diagram of a portion of a wind turbine control system 200 that may be used to monitor and control at least a portion of a wind turbine 300. In some embodiments, wind turbine control system 200 also includes sufficient computer-readable/executable instructions, data structures, program modules, and program sub-modules, to receive other data associated with measured values from other wind turbine systems to facilitate overall operation of wind turbine 300. Alternatively, wind turbine control system 200 is a stand-alone system. Further, alternatively, wind turbine control system 200 is any computer-based system that may monitor portions of, and generate models for wind turbine 300. In the exemplary embodiment, wind turbine control system 200 includes at least one central processing unit (CPU) 215 configured to execute monitoring algorithms and monitoring logic. CPU 215 may be coupled to other devices 220 via a network 225. In some embodiments, network 225 is a wireless network.

Referring to FIGS. 1 and 2, CPU 215 is a computing device 105. In the exemplary embodiment, computing device 105 is coupled to network 225 via communication interface 135. In an alternative embodiment, CPU 215 is integrated with other devices 220.

CPU 215 interacts with a first operator 230, e.g., without limitation, via user input interface 130 and/or presentation interface 120. In one embodiment, CPU 215 presents information about wind turbine 300, such as measured blade pitch positions, to operator 230. Other devices 220 interact with a second operator 235, e.g., without limitation, via user input interface 130 and/or presentation interface 120. For example, other devices 220 present alarms and/or other operational information to second operator 235. As used herein, the term "operator" includes any person in any capacity associated with operating and maintaining wind turbine 300, including, without limitation, shift operations personnel, maintenance technicians, and facility supervisors.

In the exemplary embodiment, wind turbine 300 includes one or more monitoring sensors 240 coupled to CPU 215 through at least one input channel 245. Monitoring sensors 240 collect operational measurements including, without limitation, sound pressure measurements emanating from portions of wind turbine 300. Monitoring sensors 240 may also collect other operational measurements including, without limitation, wind speeds and directions in portions of wind turbine 300. Monitoring sensors 240 repeatedly, e.g., periodically, continuously, and/or upon request, transmit operational measurement readings at the time of measurement. CPU 215 receives and processes the operational measurement readings. Such data is transmitted across network 225 and may be accessed by any device capable of accessing network 225 including, without limitation, desktop computers, laptop computers, and personal digital assistants (PDAs) (neither shown).

Figure 3:
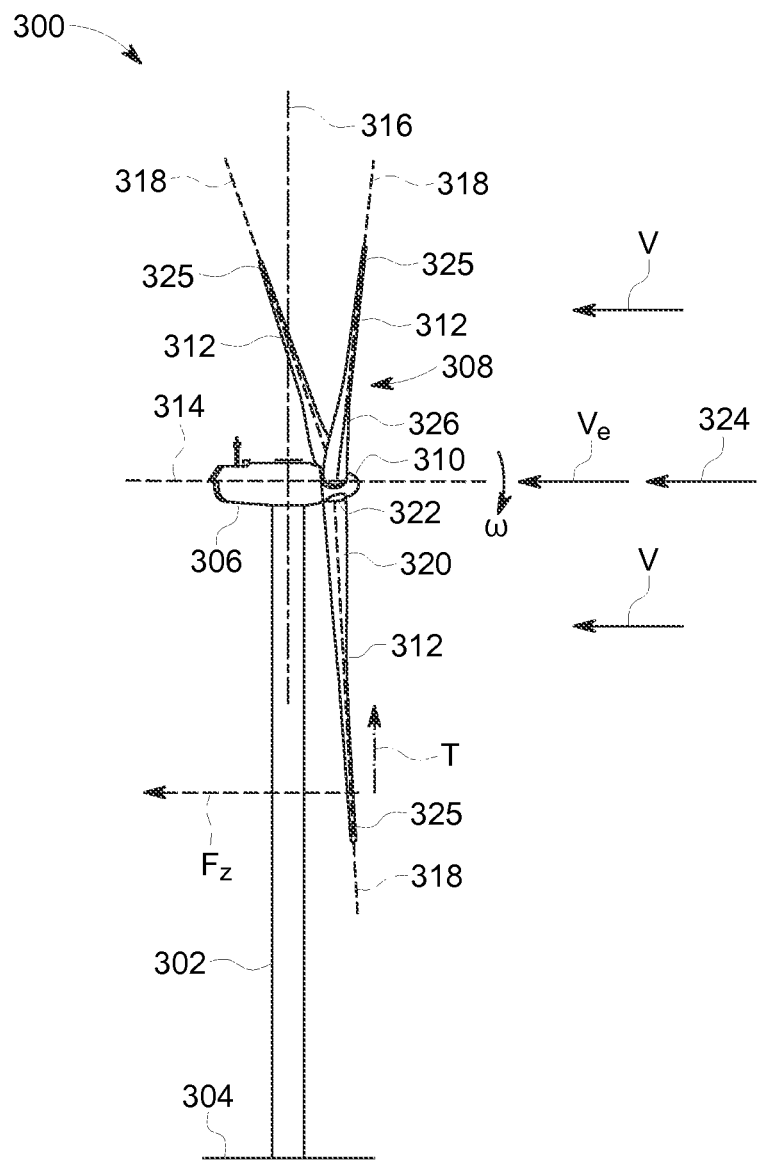
FIG. 3 is a schematic view of an exemplary wind turbine that may be monitored and controlled through the wind turbine control system shown in FIG. 2.

FIG. 3 is a schematic view of an exemplary wind turbine 300 that may be monitored and controlled through wind turbine control system 200 (shown in FIG. 2). In the exemplary embodiment, wind turbine 300 is a horizontal axis wind turbine. Alternatively, wind turbine 300 may be a vertical axis wind turbine. Wind turbine 300 includes a tower 302 extending from a supporting surface 304, a nacelle 306 coupled to tower 302, and a rotor 308 coupled to nacelle 306. Rotor 308 has a rotatable hub 310 and a plurality of rotor blades 312 coupled to hub 310. In the exemplary embodiment, rotor 308 has three rotor blades 312. Alternatively, rotor 308 has any number of rotor blades 312 that enables wind turbine 300 to function as described herein. In the exemplary embodiment, tower 302 is fabricated from tubular steel and has a cavity (not shown in FIG. 3) extending between supporting surface 304 and nacelle 306. Alternatively, tower 302 is any tower that enables wind turbine 300 to function as described herein including, but not limited to, a lattice tower. The height of tower 302 is any value that enables wind turbine 300 to function as described herein.

Blades 312 are positioned about rotor hub 310 to facilitate rotating rotor 308, thereby transferring kinetic energy from wind 324 into usable mechanical energy, and subsequently, electrical energy. Rotor 308 and nacelle 306 are rotated about tower 302 on a yaw axis 316 to control the perspective of blades 312 with respect to the direction of wind 324. Blades 312 are mated to hub 310 by coupling a blade root portion 320 to hub 310 at a plurality of load transfer regions 322. Load transfer regions 322 have a hub load transfer region and a blade load transfer region (both not shown in FIG. 3). Loads induced in blades 312 are transferred to hub 310 via load transfer regions 322. Each of blades 312 also includes a blade tip portion 325.

In the exemplary embodiment, blades 312 have a length between 50 meters (m) (164 feet (ft)) and 100 m (328 ft), however these parameters form no limitations to the instant disclosure. Alternatively, blades 312 may have any length that enables wind turbine to function as described herein. As wind 324 strikes each of blades 312, blade lift forces (not shown) are induced on each of blades 312 and rotation of rotor 308 about rotation axis 314 is induced as blade tip portions 325 are accelerated. A pitch position, or pitch angle (not shown) of blades 312, i.e., an angle that determines each of blades' 312 perspective with respect to the direction of wind 324, may be changed by a pitch adjustment mechanism (not shown in FIG. 3). Specifically, increasing a pitch angle of blade 312 decreases a percentage of area 326 exposed to wind 324 and, conversely, decreasing a pitch angle of blade 312 increases a percentage of area 326 exposed to wind 324.

For example, a blade pitch angle of approximately 0 degrees (sometimes referred to as a "power position") exposes a significant percentage of a blade surface area 326 to wind 324, thereby resulting in inducement of a first value of lift forces on blade 312. Similarly, a blade pitch angle of approximately 90 degrees (sometimes referred to as a "feathered position") exposes a significantly lower percentage of blade surface area 326 to wind 324, thereby resulting in inducement of a second value of lift forces on blade 312. The first value of lift forces induced on blades 312 is greater than the second value of lift forces induced on blades 312 such that values of lift forces are directly proportional to blade surface area 326 exposed to wind 324. Therefore, values of lift forces induced on blades 312 are indirectly proportional to values of blade pitch angle.

Also, for example, as blade lift forces increase, a rotational acceleration of blade tip portion 325 increases. Conversely, as blade lift forces decrease, rotational acceleration of blade tip portion 325 decreases. Therefore, values of rotational acceleration of blade tip portion 325 are related to values of lift forces induced on blades 312 and it follows that rotational acceleration of blade tip portion 325 is related to blade pitch angle. The pitch angles of blades 312 are adjusted about a pitch axis 318 for each of blades 312. In the exemplary embodiment, the pitch angles of blades 312 are controlled individually. Alternatively, blades' 312 pitch may be controlled as a group.

Further, in FIG. 3, reference numeral 324 is generally representative of wind. Wind 324 will typically have a mean speed ($\upsilon$) and an effective wind speed ($\upsilon_e$). The effective wind speed ($\upsilon_e$) is representative of an effective speed of wind 324 at a hub height of wind turbine 300. Since wind 324 is distributed spatially and temporally, wind speed varies significantly at different points over the area swept by wind turbine blades 312. Therefore, different portions of wind turbine 300 may experience different wind speeds. Moreover, effective wind speed ($\upsilon_e$) is representative of a difference between mean wind speed (v) and the tower top velocity. Accordingly, effective wind speed ($\upsilon_e$) is typically utilized in wind turbine models for various computations.

Moreover, as the wind 324 blows in the indicated direction, wind 324 induces an aerodynamic torque (T) and an aerodynamic thrust ($F_z$) on wind turbine 300. Particularly, the aerodynamic torque (T) that is induced on wind turbine blades 312 causes wind turbine blades 312 to rotate in a direction that is substantially perpendicular to the direction of wind 324. This rotary motion of wind turbine blades 312 is represented by an angular rotor speed ($\omega$) of rotor 310.

Figure 4:
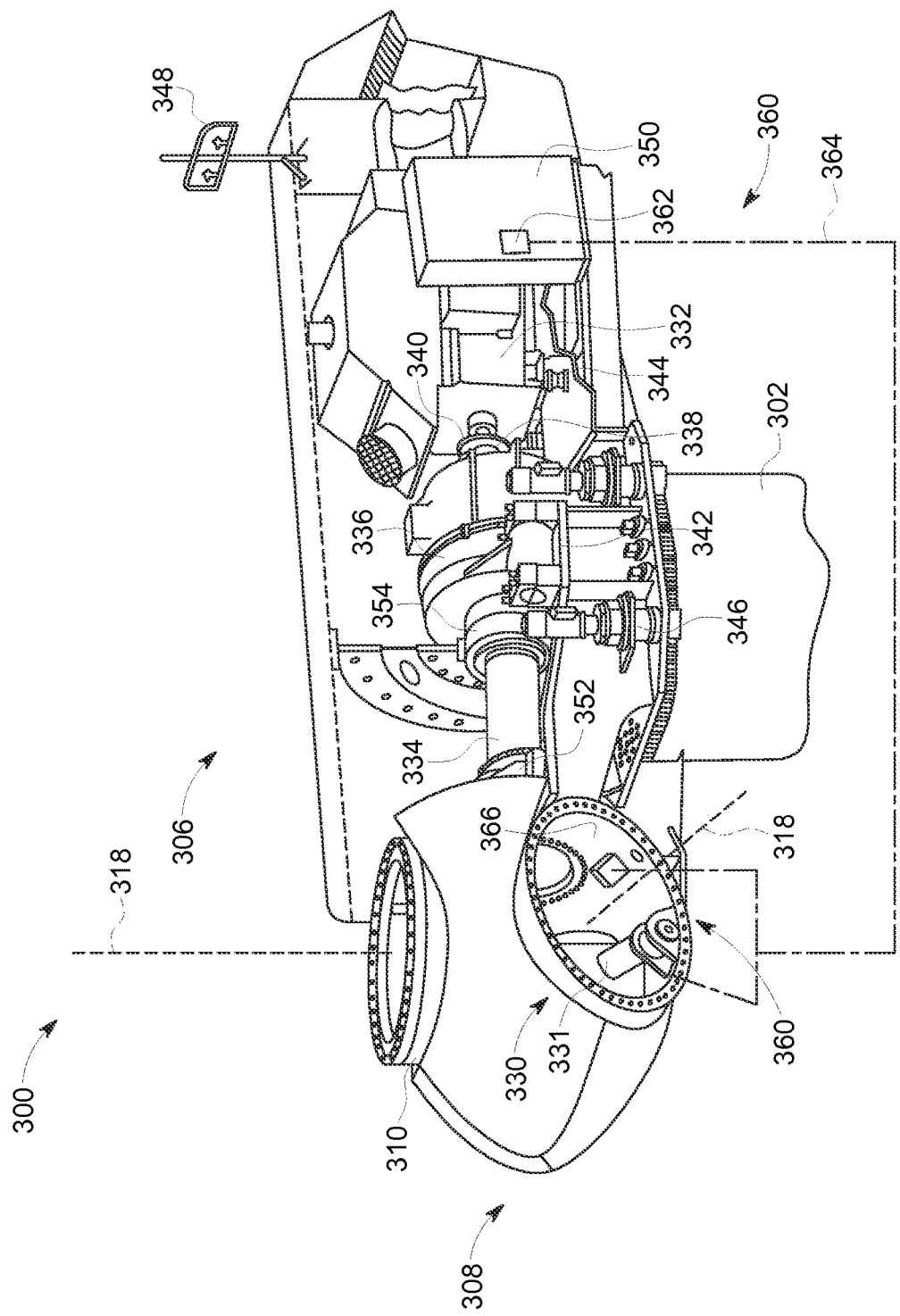
FIG. 4 is a cross-sectional schematic view of a nacelle that may be used with the wind turbine shown in FIG. 3.

FIG. 4 is a cross-sectional schematic view of nacelle 306 of exemplary wind turbine 300. Various components of wind turbine 300 are housed in nacelle 306 atop tower 302 of wind turbine 300. Nacelle 306 includes one pitch drive mechanism 330 that is coupled to one blade 312 (shown in FIG. 3), where mechanism 330 modulates the pitch of associated blade 312 along pitch axis 318. Only one of three pitch drive mechanisms 330 is shown in FIG. 4. In the exemplary embodiment, each pitch drive mechanism 330 includes at least one pitch drive motor 331, where pitch drive motor 331 is any electric motor driven by electrical power that enables mechanism 330 to function as described herein. Alternatively, pitch drive mechanisms 330 include any suitable structure, configuration, arrangement, and/or components such as, but not limited to, hydraulic cylinders, springs, and servomechanisms. Moreover, pitch drive mechanisms 330 may be driven by any suitable means such as, but not limited to, hydraulic fluid, and/or mechanical power, such as, but not limited to, induced spring forces and/or electromagnetic forces.

Nacelle 306 also includes a rotor 308 that is rotatably coupled to an electric generator 332 positioned within nacelle 306 via rotor shaft 334 (sometimes referred to as low speed shaft 334), a gearbox 336, a high speed shaft 338, and a coupling 340. Rotation of shaft 334 rotatably drives gearbox 336 that subsequently rotatably drives shaft 338. Shaft 338 rotatably drives generator 332 via coupling 340 and shaft 338 rotation facilitates generator 332 production of electrical power. Gearbox 336 and generator 332 are supported by supports 342 and 344, respectively. In the exemplary embodiment, gearbox 336 utilizes a dual path geometry to drive high speed shaft 338. Alternatively, main rotor shaft 334 is coupled directly to generator 332 via coupling 340.

Nacelle 306 further includes a yaw adjustment mechanism 346 that may be used to rotate nacelle 306 and rotor 308 on axis 316 (shown in FIG. 4) to control the perspective of blades 312 with respect to the direction of the wind. Nacelle 306 also includes at least one meteorological mast 348, where mast 348 includes a wind vane and anemometer (neither shown in FIG. 4). Mast 348 provides information to a turbine control system (not shown) that may include wind direction and/or wind speed. A portion of the turbine control system resides within a control panel 350. Nacelle 306 further includes forward and aft support bearings 352 and 354, respectively, where bearings 352 and 354 facilitate radial support and alignment of shaft 334.

Wind turbine 300 includes a pitch control system 360, where at least a portion of pitch control system 360 is positioned in nacelle 306, or alternatively, outside nacelle 306. Specifically, at least a portion of pitch control system 360 described herein includes at least one controller, i.e., processor 362 and a memory device (not shown), and at least one input/output (I/O) conduit 364, where conduit 364 includes at least one I/O channel (not shown). More specifically, processor 362 is positioned within control panel 350. In some embodiments, processor 362 is substantially similar to, or includes, processor 115 (shown in FIG. 1).

Processor 362 and other processors (not shown) as described herein process information transmitted from a plurality of electrical and electronic devices that may include, but not be limited to, blade pitch position feedback devices 366 (described further below) and electric power generation feedback devices (not shown). RAM and storage devices (not shown) store and transfer information and instructions to be executed by processor 362. RAM and storage devices can also be used to store and provide temporary variables, static (i.e., non-changing) information and instructions, or other intermediate information to processor 362 during execution of instructions by processor 362. Instructions that are executed include, but are not limited to, resident blade pitch system 360 control commands. The execution of sequences of instructions is not limited to any specific combination of hardware circuitry and software instructions.

In the exemplary embodiment, at least a portion of pitch control system 360 including, but not limited to, processor 362 is positioned within control panel 350. Moreover, processor 362 is coupled to blade pitch drive motors 331 via at least one I/O conduit 364. I/O conduit 364 includes any number of channels having any architecture including, but not limited to, Cat 5/6 cable, twisted pair wiring, and wireless communication features. Pitch control system 360 may include distributed and/or centralized control architectures, or any combination thereof.

Pitch control system 360 also includes a plurality of independent blade pitch position devices 366 coupled with processor 362 via at least one I/O conduit 364. In the exemplary embodiment, each pitch drive mechanism 330 is associated with a single blade pitch position feedback device 366. Alternatively, any number of position feedback devices 366 are associated with each mechanism 330. Therefore, in the exemplary embodiment, mechanism 330 and associated drive motor 331, as well as device 366, are included in system 360 as described herein. Each position feedback device 366 measures a pitch position of each blade 312, or more specifically an angle of each blade 312 with respect to wind 324 (shown in FIG. 3) and/or with respect to rotor hub 310. Position feedback device 366 is any suitable sensor having any suitable location within or remote to wind turbine 300, such as, but not limited to, optical angle encoders, magnetic rotary encoders, and incremental encoders, or some combination thereof. Moreover, position feedback device 366 transmits pitch measurement signals (not shown) that are substantially representative of associated blade 312 pitch position to processor 362 for processing thereof.

In operation of wind turbine 300, various malfunction conditions may occur and upon detection of some of these malfunctions, it may be desirable to shut down wind turbine 300. The malfunction conditions may include, for example, and without limitation, communication error between pitch drive motors 331 and processor 362 through conduits 364, wind turbine blades 312 mechanically unable to change their respective pitch angles about axis 318, malfunction of associated blade pitch position feedback devices 366, and electrical faults in pitch drive motors 331. Such malfunctions induce a rotor imbalance in wind turbine 300 and it is desirable to minimize the rotor imbalance. As such, it is desirable to determine magnitude of the rotor imbalance and to predict the magnitude of future rotor imbalances during the pitch drive malfunction events. The rotor imbalance is determined by computing a resultant moment, where the resultant moment is based on moments and aerodynamic parameters corresponding to each of wind turbine blades 312. In one embodiment, the moments may include hub flange resultant moments and yaw bearing nodding moments, both described further below.

Figure 5:
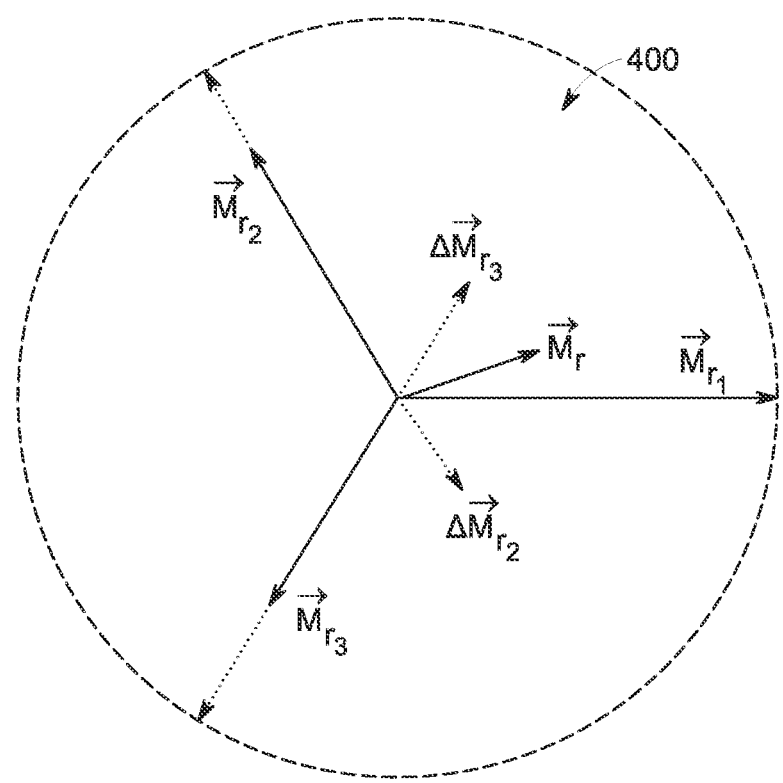
FIG. 5 is a vectorial representation of moments induced in a plurality of wind turbine blades resulting in a rotor imbalance on the wind turbine shown in FIG. 3.
Figure 6:
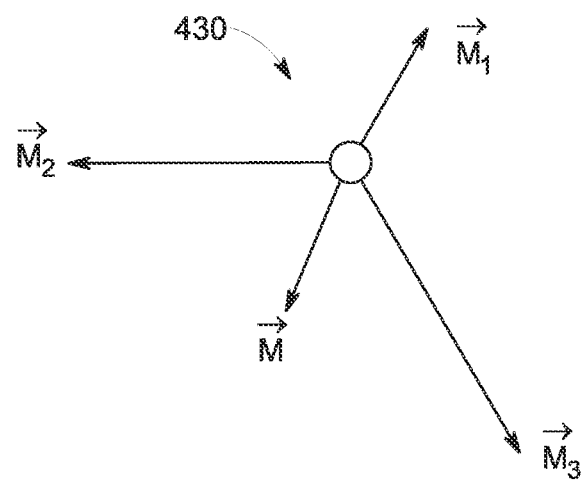
FIG. 6 is another vectorial representation of moments induced in a plurality of wind turbine blades resulting in a hub flange resultant moment on the wind turbine shown in FIG. 3.

FIG. 5 is a vectorial representation 400 of moments induced in wind turbine blades 312 resulting in an imbalance of rotor 308 of wind turbine 300 (all shown in FIG. 3). FIG. 6 is another vectorial representation 430 of moments induced in wind turbine blades 312 (shown in FIG. 3) resulting in a hub flange resultant moment ($M_{res}XY$) on wind turbine 300.

In general, for a rotor-based frame of reference, e.g., rotor 308 (shown in FIGS. 3 and 4) with three blades 312 (as shown in FIG. 3), where each blade 312 positioned with an azimuth angle of $\phi_i$, i=1, 2, 3, where $\phi_2=\phi_1+120°$, and $\phi_3=\phi_1+240°$, the modeled aerodynamic thrust ($F_{z_i}$) for each of wind turbine blades 312 is determined using the following equation:

$$F_{Z_i} = \frac{1}{6}\rho\pi R^2 C_t(\lambda, \theta_i)v_e^2, \qquad \text{Eq. (1)}$$

where $\rho$ represents the density of air, R represents a length of wind turbine blades 312, $C_t(\lambda, \theta_i)$ represents an aerodynamic thrust map for each blade 312 with a tip speed ratio ($\lambda$) and a pitch angle ($\theta_i$), and $\upsilon_e$ represents the effective wind speed.

The aerodynamic thrust $F_{z_i}$ exerts a moment $\vec{M}_i$ on each of wind turbine blades i, which may be represented by the equation:

$$\vec{M}_i = \begin{bmatrix} \cos\phi_i \\ \sin\phi_i \end{bmatrix} F_{Z_i} \tilde{R}, \quad \text{Eq. (2)}$$

where $\vec{M}_i$ represents a moment for each wind turbine blade i, $\vec{M}_1$, $\vec{M}_2$ and $\vec{M}_3$ are representative of the moments of the first, second, and third wind turbine blades 312, $\phi_i$ represents an azimuth angle of each wind turbine blade i, and $\tilde{R}$ represents an effective arm length of aerodynamic thrust $F_{z_i}$ of each of wind turbine blades i.

A rotor imbalance occurs in situations where a resultant moment ($\vec{M}_r$) of wind turbine blades i is non-zero, i.e., $\vec{M}_r \neq 0$. Accordingly, the resultant moment $\vec{M}_r$ of wind turbine blades i may be predicted based on a vector representation as described herein. For a three-bladed wind turbine, the magnitude of a resulting unbalance moment vector satisfies the following equation:

$$|\vec{M}_r|^2 = |\Delta\vec{M}_{r2}|^2 + |\Delta\vec{M}_{r3}|^2 - |\Delta\vec{M}_{r2}||\Delta\vec{M}_{r3}|, \quad \text{Eq. (3)}$$

where $\Delta\vec{M}_{r2}$ represents the moment vector with a magnitude equal to the difference between moments $\vec{M}_1$ and $\vec{M}_2$ having the same orientation as $\vec{M}_2$, and $\Delta\vec{M}_{r3}$ represents the moment vector with a magnitude equal to the difference between moments $\vec{M}_1$ and $\vec{M}_3$ having the same orientation as $\vec{M}_3$. For the example of blade 1 malfunctioning and blades 2 and 3 controlled to the same pitch angle, then:

$$|\Delta\vec{M}_{r2}| = |\Delta\vec{M}_{r3}|, \quad \text{Eq. (4)}$$

such that:

$$|\vec{M}_r| = |\Delta\vec{M}_{r2}| = |\Delta\vec{M}_{r3}|, \quad \text{Eq. (5)}$$

and:

$$|\vec{M}_r| = ||\vec{M}_1| - |\vec{M}_2|| = ||\vec{M}_1| - |\vec{M}_3||. \quad \text{Eq. (6)}$$

Figure 7:
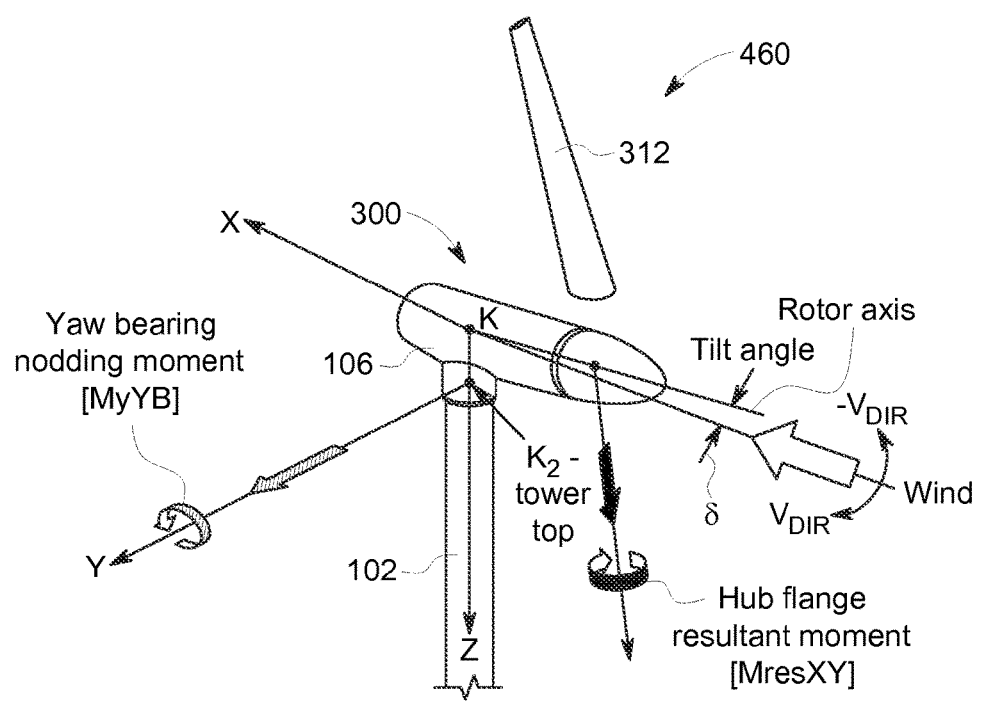
FIG. 7 is yet another vectorial representation of moments induced in a plurality of wind turbine blades resulting in a hub flange resultant moment and a yaw bearing nodding moment on the wind turbine shown in FIG. 3.

FIG. 7 is yet another vectorial representation 460 of moments induced in wind turbine blades 312 resulting in a hub flange resultant moment (MresXY) and a yaw bearing nodding moment (MyYB) on wind turbine 300. Orthogonal X-, Y-, and Z-axis are shown for reference. $G_1$ represents the moment at the hub due to gravity, and as such, the hub flange resultant moment MresXY satisfies the equation:

$$MresXY \leq |\vec{M}_r| + G_1, \quad \text{Eq. (7)}$$

where the equality holds when the imbalance moment $\vec{M}_r$ points in the same direction as gravity. Using equations (1), (2) and (6), the following relationship is derived:

$$MresXY \leq \tilde{R} \cdot |F_{Z_1} - F_{Z_{2,3}}| + G_1 \quad \text{Eq. (8)}$$

$$\leq \frac{1}{6}\rho\pi R^2 v_e^2 \tilde{R} \cdot |C_t(\lambda, \theta_1) - C_t(\lambda, \theta_{2,3})| + G_1, \quad \text{Eq. (9)}$$

where $F_{z_i}$ represents an aerodynamic thrust at the first wind turbine blade 312, $F_{Z_{2,3}}$ represents an aerodynamic thrust at the second and third wind turbine blades 312, and $\theta_{2,3} = \theta_2 = \theta_3$.

Letting MresXY$_{max}$ equal the maximum tolerable hub flange moment, from equation (8), the following sufficient condition is derived for MresXY<MresXY$_{max}$:

$$F_{Z_1} + \frac{MresXY_{max} - G_1}{\tilde{R}} > F_{Z_{2,3}} > F_{Z_1} - \frac{MresXY_{max} - G_1}{\tilde{R}}, \quad \text{Eq. (10)}$$

or in short:

$$F_{Z_{max}} > F_{Z_{2,3}} > F_{Z_{min}}. \quad \text{Eq. (11)}$$

Equations (10) and (11) are used to design control strategies to constrain imbalance loads during shutdown of wind turbine 300. For example, when hub flange resultant moment MresXY is outside of established parameters, i.e., when MresXY>MresXY$_{max}$, the second and third wind turbine blades 312 attain pitch angles such that hub flange resultant moment MresXY is maintained within established parameters by controlling to MresXY<MresXY$_{max}$.

As such, for those embodiments of a rotor imbalance control sub-system (not shown in FIG. 7 and discussed further below), upon detection of exceeding the threshold hub flange resultant moment MresXY$_{max}$, and a gradient control embodiment of the rotor imbalance control sub-system is used to facilitate returning the aerodynamic thrust for each of wind turbine blades 312 to within the thrust parameters, the following control algorithm is derived:

$$\theta_{k+1} = \theta_k - \alpha \cdot (F_{Z,max,k} - F_{Z,2,3,k}) \cdot \left(\frac{dF_Z}{d\theta}\right)^{-1}\bigg|_k, \quad \text{Eq. (12)}$$

were $\theta_{k+1}$ represents a determined pitch angle, $\theta_k$ represents the current pitch angle, $\alpha$ represents a step size, $F_{Z,max,k}$ represents aerodynamic thrust boundary conditions, $F_{Z,k}$ represents a current aerodynamic thrust, and $$\frac{dF_Z}{d\theta}\bigg|_k$$

represents a partial derivative representing a current aerodynamic thrust gradient with respect to the pitch angle at the current pitch angle. Similarly, in the case where $F_{Z,2,3,k} < F_{Z,min,k}$:

$$\theta_{k+1} = \theta_k - \alpha \cdot (F_{Z,min,k} - F_{Z,2,3,k}) \cdot \left(\frac{dF_Z}{d\theta}\right)^{-1}\bigg|_k. \quad \text{Eq. (13)}$$

Moreover, the yaw bearing nodding moment MyYB (at the tower top) is represented by the following equation, where $G_2$ is the moment at the tower top due to gravity:

$$MyYB = \sum_{i=1}^{3} F_{Z_i} \tilde{R} \cos\phi_i + G_2 \quad \text{Eq. (14)}$$

$$= \sum_{i=1}^{3} \frac{1}{6}\rho\pi R^2 C_t(\lambda, \theta_i) v_e^2 \tilde{R} \cos\phi_i + G_2. \quad \text{Eq. (15)}$$

Similar control strategies are derived for maintaining yaw bearing nodding moment MyYB within established parameters. Also, the above described assume a similar effective wind speed $\upsilon_e$ with respect to all of blades 312, and that shear and yaw effects are discounted. Alternatively, to further refine the derivations of the model, more intensive calculations with different effective wind speed $\upsilon_e$ with respect to each of blades 312, and taking into account yaw and shear effects, may be used.

Figure 8:
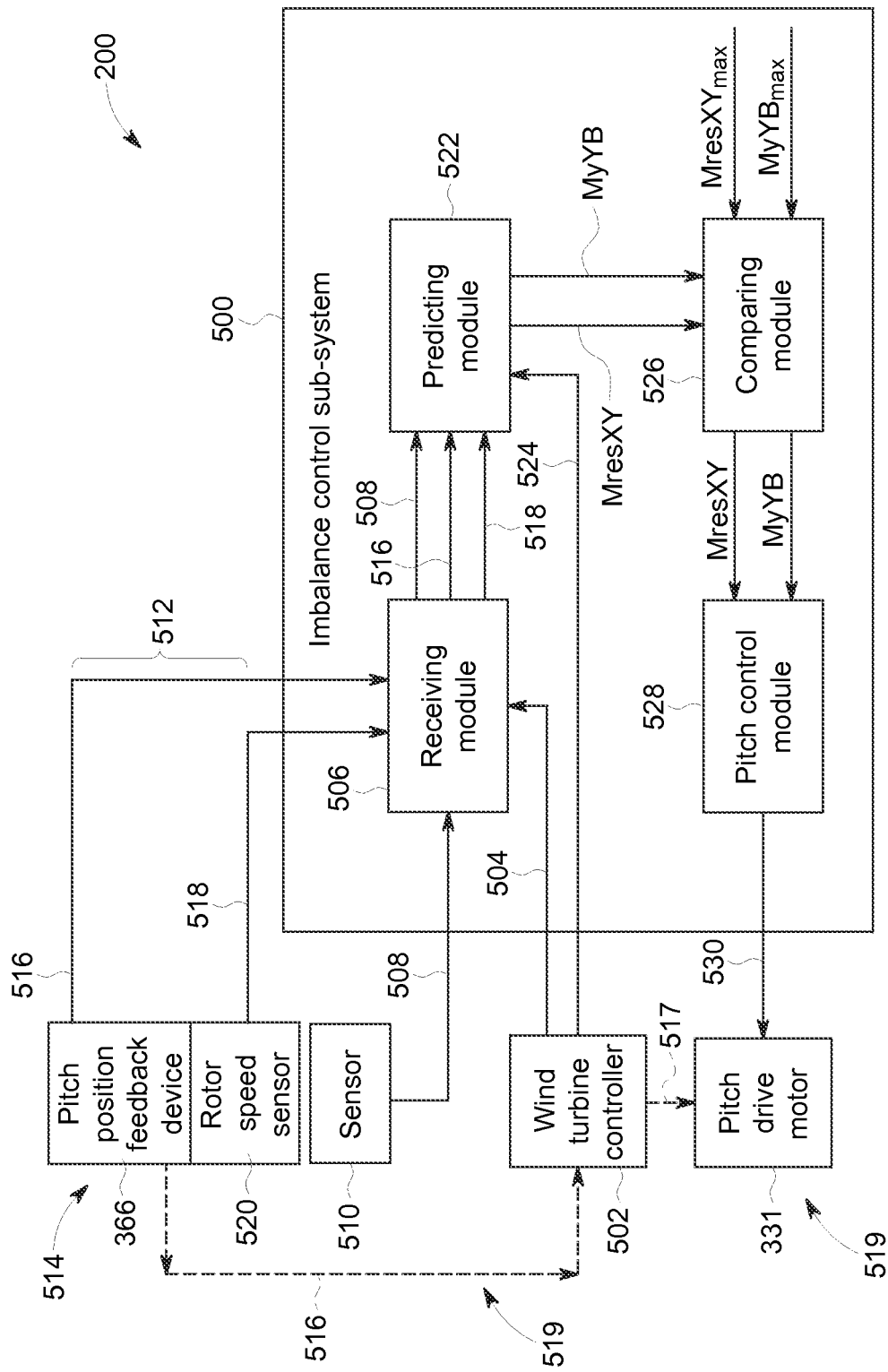
FIG. 8 is a schematic block diagram of an exemplary gradient-based rotor imbalance control sub-system architecture that may be used with the wind turbine shown in FIG. 3.

FIG. 8 is a schematic block diagram of an exemplary rotor imbalance control sub-system 500 architecture that may be used with wind turbine 300 (shown in FIG. 3). Sub-system 500 is implemented with a gradient-based strategy using physics-based models to predict particular system dynamics, e.g., predict the pitch reference trajectory of wind turbine blades 312 (shown in FIG. 3) using rotor imbalance as a constraint. The architecture of sub-system 500 is one of closed loop control. Rotor imbalance control sub-system 500 is implemented in one or more processors such as processor 115 (shown in FIG. 1).

In the exemplary embodiment, rotor imbalance control sub-system 500 is configured to reduce the rotor imbalance in wind turbine 300 during shutdown. More particularly, imbalance control sub-system 500 is a stand-alone system implemented within control panel 350 (shown in FIG. 4). Alternatively, imbalance control sub-system 500 is implemented at a location remote from wind turbine 300. Furthermore, imbalance control sub-system 500 is configured to generate a pitch control command corresponding to wind turbine blades 312 to reduce the rotor imbalance.

In the exemplary embodiment, imbalance control sub-system 500 is automatically triggered to generate pitch control commands in response to an exceedance of a predetermined threshold for rotor imbalance. Sub-system 500 is coupled to a wind turbine controller 502. Sub-system 500 includes a receiving module 506 that, in some embodiments, as an anticipatory signal of an increased potential of a blade drive system failure, receives shutdown command signals 504 from wind turbine controller 502. Receiving module 506 also receives a wind speed signal 508 from one or more wind speed sensors 510 positioned within meteorological mast 348 (shown in FIG. 4) or any other location. In some embodiments, imbalance control sub-system 500 receives wind speed signals 508 subsequent to receiving shutdown command 504. In other embodiments, wind speed sensors 510 include devices such as, without limitation, an anemometer, a light detection and ranging (LIDAR) sensor, and an accelerometer. Alternatively, the wind speed may not be directly obtained, but estimated using data from different sensors.

Receiving module 506 receives wind turbine component parameter signals 512 from one or more wind turbine components 514. In the exemplary embodiment, wind turbine component parameter signals 512 include blade pitch angle signals 516 corresponding to each of wind turbine blades 312 transmitted from a corresponding blade pitch position feedback device 366. Also, rotor rotational speed signals 518 are transmitted from a rotor speed sensor 520.

In the exemplary embodiment, wind turbine controller 502 is coupled to blades 312 though pitch drive motors 331 and pitch position feedback device 366. As such, under typical operating conditions, wind turbine controller 502 generates pitch control signals 517 and receives blade pitch angle feedback signals 516, thereby defining a closed loop blade pitch control system 519. If the difference between signals 516 and 517 exceeds predetermined parameters, wind turbine controller 502 determines whether there is a malfunction of a portion of blade pitch drive mechanism 330 (shown in FIG. 4) associated with at least one first rotor blade 312 of plurality of rotor blades 312. Under such circumstances, wind turbine controller 502 transmits shutdown command signals 504 to the appropriate control devices of wind turbine 300 and pitch-out of blades 312 is initiated as described further below. Alternatively, a malfunction of blade pitch drive mechanism 330 is determined after a normal, commanded shutdown process has commenced.

Rotor imbalance control sub-system 500 also includes a predicting module 522 coupled to receiving module 506. Predicting module 522 receives wind speed signals 508, blade pitch angle signals 516, and rotor rotational speed signals 518 from receiving module 506. In addition, predicting module 522 receives other measurement values and parameter signals 524 as inputs from, for example, and without limitation, wind turbine controller 502. Such measurements and parameters include, without limitation, the length of the wind turbine blades R, the effective wind speed $\upsilon_e$, the density of air $\rho$, and an aerodynamic thrust map for each blade 312 $C_t(\lambda, \theta_i)$ including the tip speed ratio $\lambda$ and the pitch angle of each wind turbine blade $\theta_i$, where i is representative of each of the wind turbine blades 312. These measurements may be transmitted from measurement devices in real-time or may be derived.

Predicting module 522 determines a modeled aerodynamic thrust $F_{z_i}$ for each of wind turbine blades 312 i using equation (1), moments $\vec{M}_i$ for each wind turbine blade 312 i using equation (2), and the resultant unbalance moment magnitude $|\vec{M}_r|$ based on the moments $\vec{M}_1$, $\vec{M}_2$, and $\vec{M}_3$ using equation (3). As described above, the rotor imbalance occurs in situations where a resultant moment $\vec{M}_r$ of wind turbine blades 312 is non-zero ($\vec{M}_r \neq 0$). Predicting module 522 also determines predicted hub flange resultant moment signals MresXY using equation (9) and predicted yaw bearing nodding moment signals MyYB using equation (15) for a predetermined period of time.

Rotor imbalance control sub-system 500 further includes a comparing module 526 coupled to predicting module 522. Sub-system 500 also includes a pitch control module 528 coupled to comparing module 526 and pitch drive motor 331. Comparing module 526 compares the predicted hub flange resultant moment MresXY with determined threshold values of the hub flange resultant moments $MresXY_{max}$. The predicted hub flange resultant moment MresXY may be less than the determined threshold value of the hub flange resultant moment $MresXY_{max}$ which is represented by the expression $MresXY < MresXY_{max}$. In the event that the constraints of the hub flange resultant moment $MresXY_{max}$ are not exceeded by the predicted hub flange resultant moment MresXY, the shutdown process for wind turbine 300 will proceed with blades 312 pitching out until blades 312 attain the feathered (or parking) position.

However, if comparing module 526 determines that the predicted hub flange resultant moment MresXY exceeds the determined threshold value of the hub flange resultant moment $MresXY_{max}$, i.e., $MresXY > MresXY_{max}$, comparing module 526 transmits the predicted hub flange resultant moment MresXY to pitch control module 528. As such, the predicted hub flange resultant moment MresXY generated using the gradient-based strategy as described herein is transmitted to pitch control module 528. Pitch control module 528 is triggered to generate a new pitch control command signal 530, based on the control algorithm shown in equation (12), that is transmitted to pitch drive motor 530.

In the exemplary embodiment, pitch control command signal 530 includes a reference pitch trajectory profile that facilitates regulation of the pitch angles of wind turbine blades 312 during shutdown. The reference pitch trajectory profile is the predicted pitch trajectory of wind turbine blades 312 using rotor imbalance as the constraint on the gradient-based solution. Therefore, the gradient-based strategy is implemented within a closed control loop that includes pitch position feedback device 366, imbalance control sub-system 500, and pitch drive motor 331. The regulation of the remaining operable blades 312 is repeated for a predetermined period of time, i.e., until the operable wind turbine blades 312 reach the feathered position. In some embodiments, pitch control module 528 is further configured to regulate a rate of change of pitch position.

As such, imbalance control sub-system 500 regulates the remaining operable blades 312 such that the predicted hub flange resultant moment MresXY returns to the predetermined parameters over a finite period of time, i.e., the predicted hub flange resultant moment MresXY no longer exceeds the determined threshold value of the hub flange resultant moment $MresXY_{max}$, i.e., $MresXY<MresXY_{max}$. This process is iterative in nature, i.e., signal 530 is transmitted to pitch drive motor 331. Pitch drive motor 331 adjusts the pitch angle $\theta_i$ of operable blades 312 and the change in pitch position 516 is fed back through device 336 to receiving module 506 such that the closed loop process as described above until the predicted hub flange resultant moment MresXY no longer exceeds the determined threshold value of the hub flange resultant moment $MresXY_{max}$.

Similarly, comparing module 526 also compares the predicted yaw bearing nodding moment MyYB with determined threshold values of the yaw bearing nodding moment $MyYB_{max}$. The predicted yaw bearing nodding moment MyYB may be less than the determined threshold value of the yaw bearing nodding moment $MyYB_{max}$ which is represented by the expression $MyYB<MyYB_{max}$. In the event that the constraints of the yaw bearing nodding moment $MyYB_{max}$ are not exceeded by the predicted yaw bearing nodding moment MyYB, the shutdown process for wind turbine 300 will proceed with blades 312 pitching out until blades 312 attain the feathered (or parking) position.

However, if comparing module 526 determines that the predicted yaw bearing nodding moment MyYB exceeds the determined threshold value of yaw bearing nodding moment $MyYB_{max}$, i.e., $MyYB>MyYB_{max}$, comparing module 526 transmits the predicted yaw bearing nodding moment MyYB to pitch control module 528. As such, the predicted yaw bearing nodding moment MyYB generated using the gradient-based strategy as described herein is transmitted to pitch control module 528. Pitch control module 528 is triggered to generate a new pitch control command signal 530, based on a control algorithm similar to that shown in equation (12) that is transmitted to pitch drive motor 530.

As described above for controlling the predicted hub flange resultant moment MresXY, in the exemplary embodiment, pitch control command signal 530 includes a reference pitch trajectory profile that facilitates regulation of the pitch angles of wind turbine blades 312 during shutdown. The reference pitch trajectory profile is the predicted pitch trajectory of wind turbine blades 312 using rotor imbalance as the constraint on the gradient-based solution. Therefore, the gradient-based strategy is implemented within a closed control loop that includes pitch position feedback device 366, imbalance control sub-system 500, and pitch drive motor 331. The regulation of the remaining operable blades 312 is repeated for a predetermined period of time, i.e., until the operable wind turbine blades 312 reach the feathered position. In some embodiments, pitch control module 528 is further configured to regulate a rate of change of pitch position.

As such, imbalance control sub-system 500 regulates the remaining operable blades 312 such that the predicted yaw bearing nodding moment MyYB returns to the predetermined parameters over a finite period of time, i.e., the predicted yaw bearing nodding moment MyYB no longer exceeds the determined threshold value of yaw bearing nodding moment $MyYB_{max}$, i.e., $MyYB<MyYB_{max}$. This process is iterative in nature, i.e., signal 530 is transmitted to pitch drive motor 331. Pitch drive motor 331 adjusts the pitch angle $\theta_i$ of operable blades 312 and the change in pitch position 516 is fed back through device 336 to receiving module 506 such that the closed loop process as described above until the predicted yaw bearing nodding moment MyYB no longer exceeds the determined threshold value of yaw bearing nodding moment $MyYB_{max}$.

Figure 9:
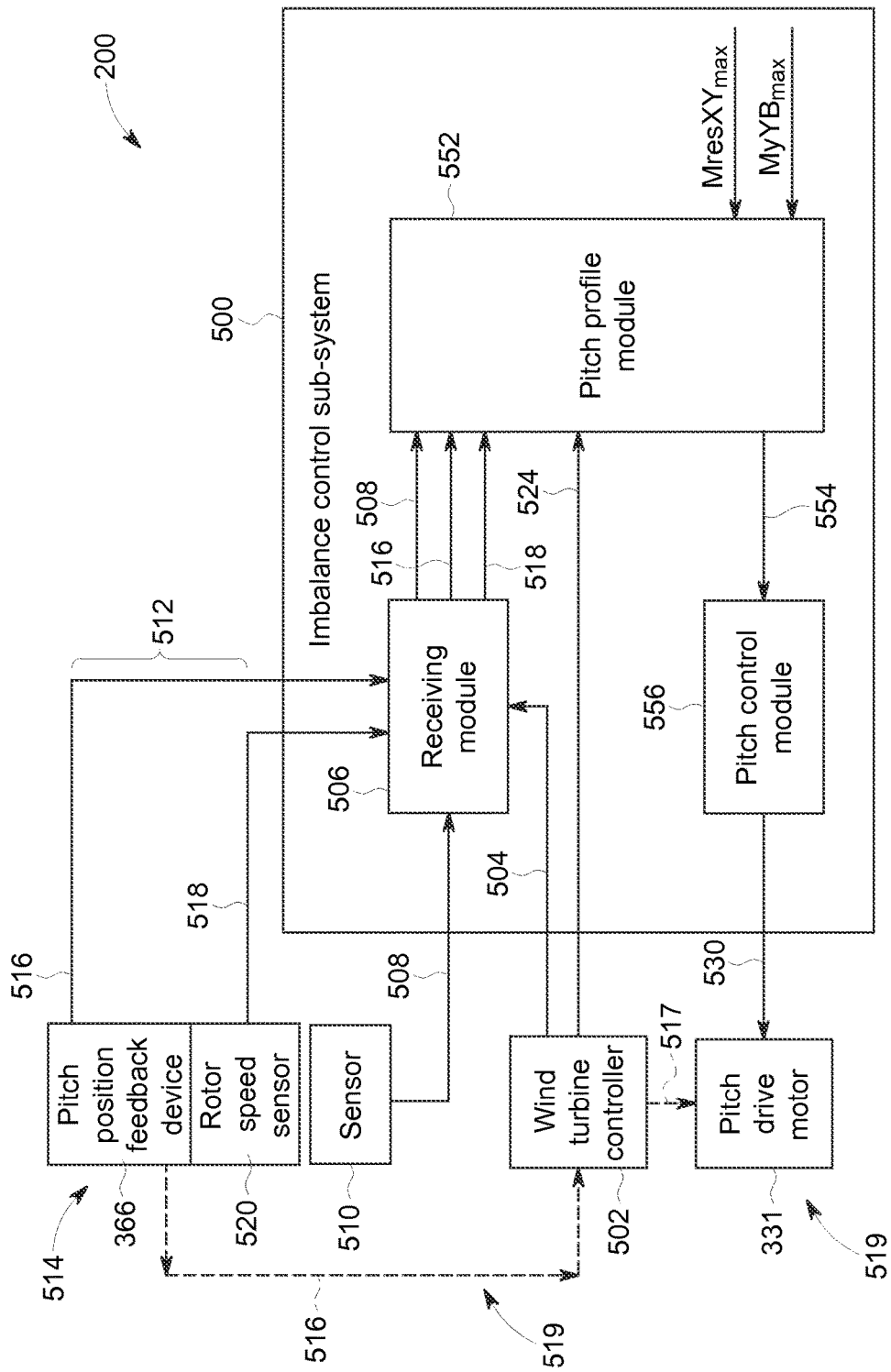
FIG. 9 is a schematic block diagram of an exemplary model predictive control-based (MPC-based) rotor imbalance control sub-system architecture that may be used with the wind turbine shown in FIG. 3.

FIG. 9 is a schematic block diagram of an exemplary model predictive control-based (MPC-based) rotor imbalance control sub-system 550 architecture that may be used with wind turbine 300 (shown in FIG. 3).

For those embodiments of a rotor imbalance control sub-system (discussed further below) where the upper parameter of blade aerodynamic thrust $F_{z_{max}}$, i.e., threshold values of the hub flange resultant moment $MresXY_{max}$ and yaw bearing nodding moment $MyYB_{max}$, are not allowed to be exceeded, a model predictive control (MPC) embodiment of the rotor imbalance control sub-system is used to facilitate maintaining the aerodynamic thrust $F_{z_i}$ for each of wind turbine blades 312 within the thrust parameters. In general, MPC, also referred to as receding horizon control, is a feedback mechanism in which physics-based models are used to predict particular system dynamics. The MPC problem to be solved is formulated as solving in real-time a finite or infinite horizon closed loop optimal control problem subject to system dynamics and constraints involving states and controls. Based on measurements obtained at time t=0, a system controller may be used to predict the future dynamic behavior of the system over a prediction time horizon at t=Tp and determine an input such that a determined open-loop performance objective function is optimized. If the system is devoid of any disturbances or model-system mismatch and if the optimization problem is solved for infinite horizons, then the input function calculated at time t=0 may be applied to the system for all times t>0. However, due to disturbances and model-system mismatch, the true system behavior is typically different from the predicted behavior. Further, in order to incorporate the feedback mechanism, the optimized input function obtained at t=0 may be implemented at a first cycle step of the system. A cycle step is representative of one cycle or one complete feedback loop of the system. Subsequently, based on newly detected variable values, the system may be configured to repeat the prediction and optimization procedure to find a new input function with the control and prediction horizons moving forward.

In the exemplary embodiment, a model predictive control (MPC) strategy with a finite, receding horizon is used predict the pitch reference trajectory of wind turbine blades 312 using rotor imbalance as a constraint on the non-linear MPC solution. The MPC strategy is implemented within a closed control loop. As such, sub-system 550 is implemented with a model predictive control (MPC) strategy with a finite, receding horizon used to predict the pitch reference trajectory of wind turbine blades 312 (shown in FIG. 3) using rotor imbalance as a constraint on the non-linear MPC solution. The architecture of sub-system 550 is one of closed loop control. Rotor imbalance control sub-system 550 is implemented in one or more processors such as processor 115 (shown in FIG. 1).

As such, in the exemplary embodiment, rotor imbalance control sub-system 550 is configured to reduce the rotor imbalance in wind turbine 300 during shutdown. More particularly, imbalance control sub-system 550 is a stand-alone system implemented within control panel 350 (shown in FIG. 4). Alternatively, imbalance control sub-system 550 is implemented at a location remote from wind turbine 300. Furthermore, imbalance control sub-system 550 is configured to generate a pitch control command corresponding to wind turbine blades 312 to reduce the rotor imbalance.

In the exemplary embodiment, imbalance control sub-system 550 is substantially always in service, as compared to imbalance control sub-system 500 (shown in FIG. 8) that is only placed into service when an imbalance parameter is exceeded. Therefore, imbalance control sub-system 550 is already in service to generate pitch control commands in response to a shutdown command signal. Similar to sub-system 500, sub-system 550 is coupled to wind turbine controller 502. Sub-system 550 includes receiving module 506 that receives shutdown command signals 504 from wind turbine controller 502. Receiving module 506 also receives wind speed signal 508 from one or more wind speed sensors 510 positioned within meteorological mast 348 (shown in FIG. 4) or any other location. In some embodiments, wind speed sensors 510 include devices such as, without limitation, an anemometer, a light detection and ranging (LIDAR) sensor, and an accelerometer. Alternatively, the wind speed may not be directly obtained, but estimated using data from different sensors.

Receiving module 506 is receives wind turbine component parameter signals 512 from one or more wind turbine components 514. In the exemplary embodiment, wind turbine component parameter signals 512 include blade pitch angle signals 516 corresponding to each of wind turbine blades 312 transmitted from a corresponding blade pitch position feedback device 366. Also, rotor rotational speed signals 518 are transmitted from a rotor speed sensor 520.

In the exemplary embodiment, wind turbine controller 502 is coupled to blades 312 though pitch drive motors 331 and pitch position feedback device 366. As such, under normal operating conditions, wind turbine controller 502 generates pitch control signals 517 and receives blade pitch angle feedback signals 516, thereby defining a closed loop blade pitch control system 519. If the difference between signals 516 and 517 exceeds predetermined parameters, wind turbine controller 502 determines whether there is a malfunction of a portion of blade pitch drive mechanism 330 (shown in FIG. 4) associated with at least one first rotor blade 312 of plurality of rotor blades 312. Under such circumstances, wind turbine controller 502 transmits shutdown command signals 504 to rotor imbalance control sub-system 500 and pitch-out of blades 312 is initiated as described further below. Alternatively, a malfunction of blade pitch drive mechanism 330 is determined after a normal shutdown process has commenced. As such, rotor imbalance control sub-system 550 will be used in the event that it is determined that at least one pitch position exceeds a predetermined pitch position parameter.

In contrast to rotor imbalance control sub-system 500, sub-system 550 includes a pitch profile module 552 coupled to receiving module 506. Pitch profile module 552 includes the algorithms and instructions necessary to not allow the threshold values of the hub flange resultant moment MresXY and yaw bearing nodding moment MyYB to be exceeded. Therefore, sub-system 550 is more sophisticated and more effective than sub-system 500.

More specifically, pitch profile module 552 uses the MPC-based properties therein to generate a planned pitch profile that anticipates exceedances of threshold rotor imbalance values given the inputs of, without limitation, wind speed signals 508, blade pitch angle signals 516, and rotor rotational speed signals 518 from receiving module 506, and generate the pitch profile that best prevents such exceedances. The planned pitch profile is selected from a number of calculated pitch profiles within pitch profile module 552, where the selected pitch profile includes the best profile of all tolerable profiles with respect to maintaining the rotor imbalances within the established parameters. Such a best pitch profile facilitates, without limitation, and in addition to avoiding exceeding the rotor imbalance parameters, speedy pitch control action to prevent exceedance of the threshold rotor imbalance values, a shutdown of wind turbine 300 as quickly as possible so that blades 312 can be retired to the feathered position, and a reduction of the impact of shutdown on the other mechanical loads induced within wind turbine 300. As such, pitch profile module 552 generates selected planned pitch profile signals 554.

Pitch profile module 552 includes many of the algorithms, instructions, and programming implemented within predicting module 522 (shown in FIG. 8). As such, pitch profile module 552 receives other measurement values and parameter signals 524 as inputs from, for example, and without limitation, wind turbine controller 502. Such measurements and parameters include, without limitation, the length of the wind turbine blades R, the effective wind speed $\upsilon_e$, the density of air $\rho$, and an aerodynamic thrust map for each blade 312 $C_t(\lambda, \theta_i)$ including the tip speed ratio $\lambda$ and the pitch angle of each wind turbine blade $\theta_i$, where i is representative of each of the wind turbine blades 312. These measurements may be transmitted from measurement devices in real-time or may be derived.

Pitch profile module 552 determines a modeled aerodynamic thrust $F_{z_i}$ for each of wind turbine blades 312 $i$ using equation (1), moments $\vec{M}_i$ for each wind turbine blade 312 $i$ using equation (2), and the resultant unbalance moment magnitude $|\vec{M}_r|$ based on the moments $\vec{M}_1$, $\vec{M}_2$, and $\vec{M}_3$ using equation (3). As described above, the rotor imbalance occurs in situations where a resultant moment $\vec{M}_r$ of wind turbine blades 312 is non-zero ($M_r \neq 0$). Pitch profile module 552 also determines predicted hub flange resultant moment MresXY using equation (9) and predicted yaw bearing nodding moment signals MyYB using equation (15) for a predetermined time horizon.

Pitch profile module 552 includes many of the algorithms, instructions, and programming implemented within predicting module 522 (shown in FIG. 8). As such, pitch profile module 552 compares the predicted hub flange resultant moment MresXY with determined threshold values of the hub flange resultant moments $\text{MresXY}_{max}$ and generates pitch profile signals 554 that prevent the predicted hub flange resultant moment MresXY from exceeding the determined threshold values of the hub flange resultant moments $\text{MresXY}_{max}$.

For those blade pitch profiles that pitch profile module 552 determines that the predicted hub flange resultant moment MresXY will exceed the determined threshold value of the hub flange resultant moment $MresXY_{max}$, i.e., $MresXY>MresXY_{max}$, pitch profile module 552 does not use that blade pitch profile. Pitch profile module 552 determines a number of tolerable blade pitch profiles where the predicted hub flange resultant moment MresXY will be less than the determined threshold value of the hub flange resultant moment $MresXY_{max}$, therefore $MresXY<MresXY_{max}$. As such, the constraints of the hub flange resultant moment $MresXY_{max}$ will not be exceeded by the predicted hub flange resultant moment MresXY, and the shutdown process for wind turbine 300 will proceed with operable blades 312 pitching out until blades 312 attain the feathered (or parking) position.

Sub-system 550 also includes a pitch control module 556 coupled to pitch profile module 552 and pitch drive motor 331. Pitch control module 556 receives selected planned pitch profile signals 554 from pitch profile module 552 that is generated using the model predictive control (MPC) strategy as described herein. Pitch control module 556 is triggered to generate a new pitch control command signal 530, based on the selected planned pitch profile signals 554.

In the exemplary embodiment, pitch control command signal 530 includes a reference pitch trajectory profile that facilitates regulation of the pitch angles of wind turbine blades 312 during shutdown. The reference pitch trajectory profile is the predicted pitch trajectory of wind turbine blades 312 using rotor imbalance as the constraint on the non-linear MPC solution. Therefore, the MPC strategy is implemented within a closed control loop that includes pitch position feedback device 366, imbalance control sub-system 550, and pitch drive motor 331. The regulation of the remaining operable blades 312 is repeated for a predetermined period of time, i.e., until the operable wind turbine blades 312 reach the feathered position. In some embodiments, pitch control module 528 is further configured to regulate a rate of change of pitch position.

Similarly, pitch profile module 552 includes the algorithms, instructions, and programming implemented therein to compare the predicted yaw bearing nodding moment MyYB with determined threshold values of the yaw bearing nodding moment $MyYB_{max}$ and generate pitch profile signals 554 that prevent the predicted yaw bearing nodding moment MyYB from exceeding the determined threshold values of the yaw bearing nodding moment $MyYB_{max}$.

For those blade pitch profiles that pitch profile module 552 determines that the predicted yaw bearing nodding moment MyYB will exceed the determined threshold value of the yaw bearing nodding moment $MyYB_{max}$, i.e., $MyYB>MyYB_{max}$, pitch profile module 552 does not use that blade pitch profile. Pitch profile module 552 determines a number of tolerable blade pitch profiles where the predicted yaw bearing nodding moment MyYB will remain less than the determined threshold value of the yaw bearing nodding moment $MyYB_{max}$, therefore $MyYB<MyYB_{max}$. As such, the constraints of the yaw bearing nodding moment $MyYB_{max}$ will not be exceeded by the predicted yaw bearing nodding moment MyYB, and the shutdown process for wind turbine 300 will proceed with operable blades 312 pitching out until blades 312 attain the feathered (or parking) position.

Figure 10:
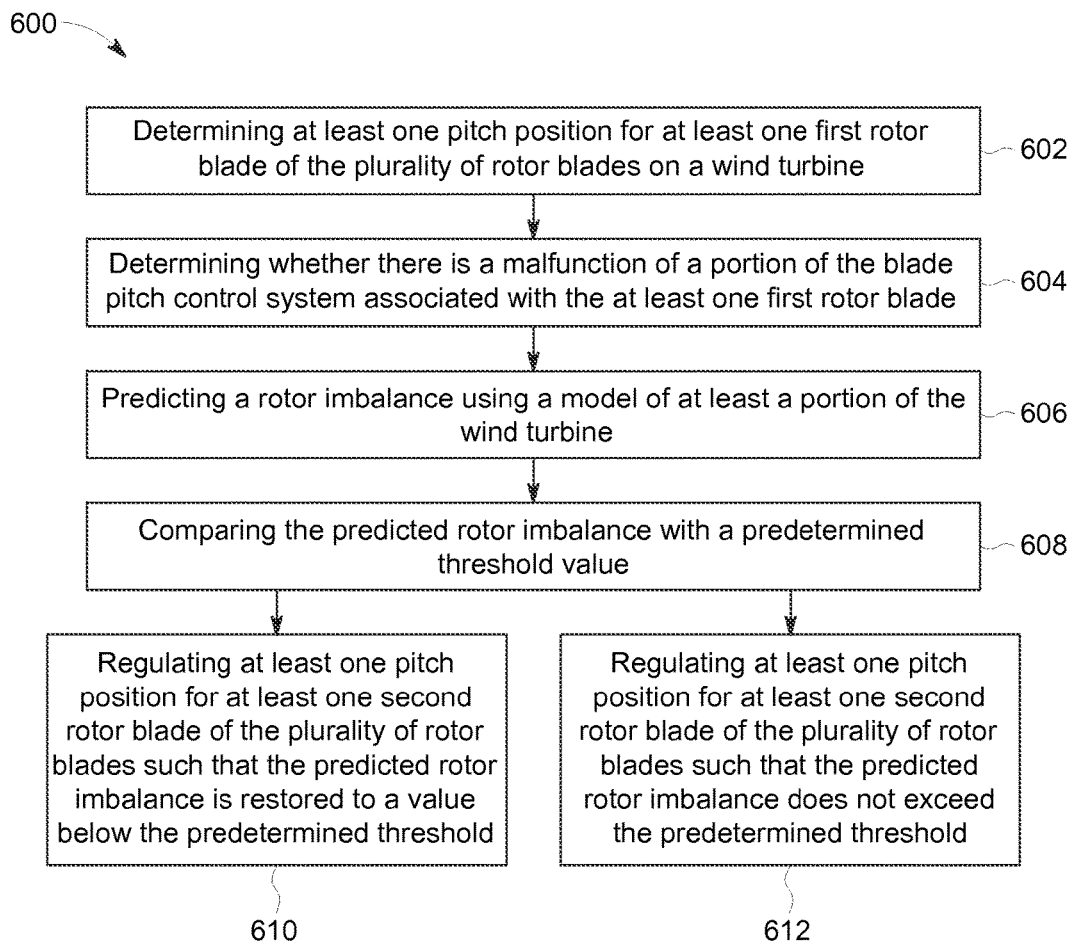
FIG. 10 is a flow chart showing an exemplary method for controlling the wind turbine shown in FIG. 3.
Figure 11:
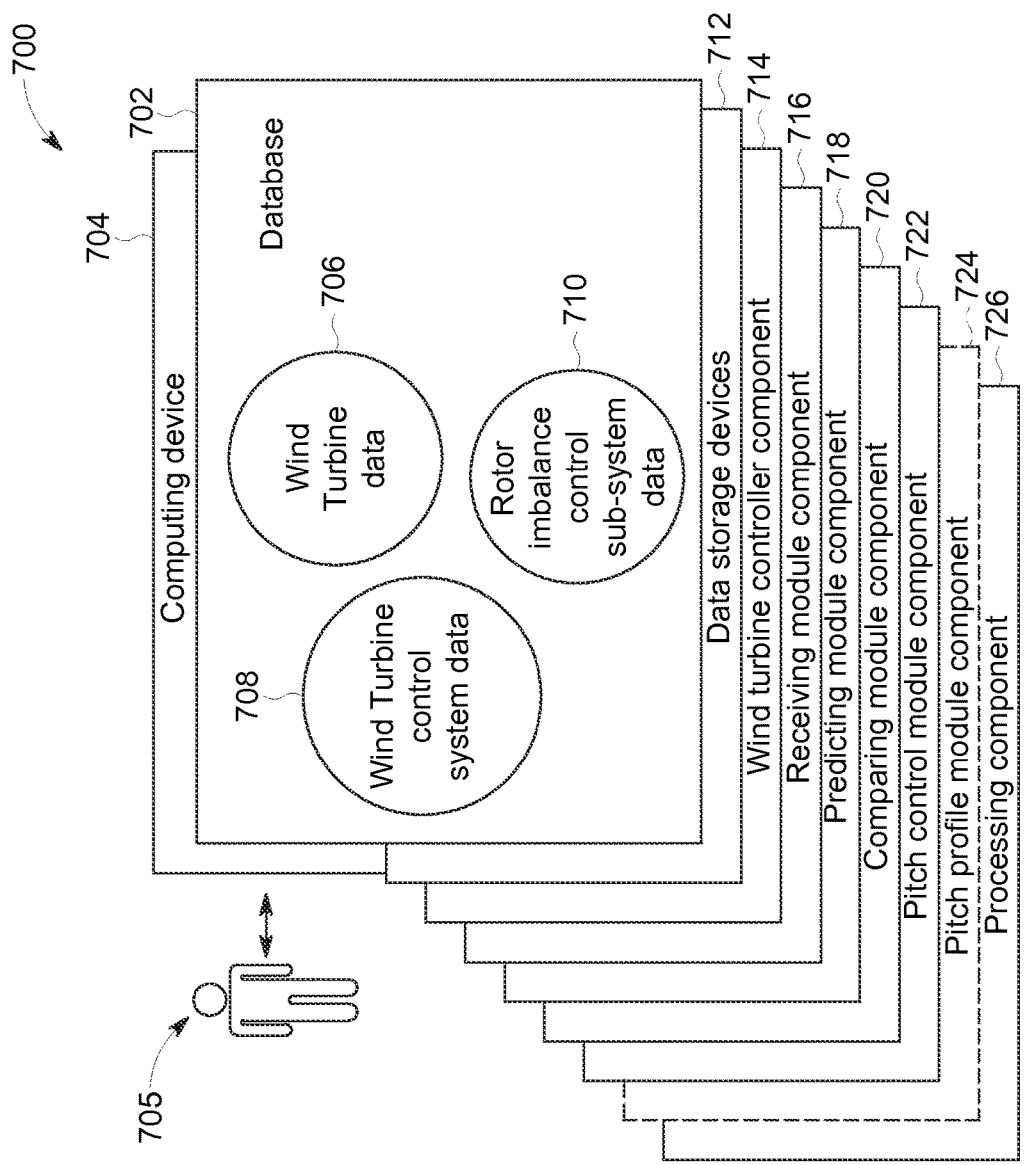
FIG. 11 is an exemplary configuration of a database within the computing device shown in FIG. 1, along with other related computing components, which may be used to control the wind turbine shown in FIG. 3 as described herein.

FIG. 10 is a flow chart showing an exemplary method 600 for controlling wind turbine 300 (shown in FIG. 3). At least one pitch position, i.e., a pitch angle $\theta_i$ for at least one first rotor blade 312 (shown in FIG. 3) of the plurality of rotor blades (312) is determined 602. As such, under typical operating conditions, wind turbine controller 502 (shown in FIGS. 8 and 9) generates pitch control signals 517 (shown in FIGS. 8 and 9). Wind turbine controller 502 determines 604 whether there is a malfunction of a portion of blade pitch control system 519 (shown on FIGS. 8 and 9) associated with the at least one first, or malfunctioning rotor blade (312). In the exemplary embodiment, wind turbine controller 502 determines whether the at least one pitch position exceeds a predetermined pitch position parameter, i.e., whether a difference between the commanded pitch position and the real-time pitch position feedback exceeds a predetermined setpoint indicative of a malfunction of blade pitch control system 519. This determination may be made during shutdown of wind turbine 300, or may be used to initiate such a shutdown.

Rotor imbalance control sub-systems 500 and 550 predict 606 a rotor imbalance using a physics-based model of at least a portion of wind turbine 300. In one embodiment, a gradient-based control strategy is implemented within a closed control loop. In another embodiment, a model predictive control (MPC) strategy with a finite, receding horizon is used and is implemented within a closed control loop. Also, in the exemplary embodiment, method step 606 includes determining real-time values of at least one determined characteristic associated with at least one of wind turbine 300 and wind proximate wind turbine 300. Further, in the exemplary embodiment, the rotor imbalance is at least partially predicted by predicting a resultant moment $\vec{M}_r$ of wind turbine blades 312 between the plurality of rotor blades 312 through determining an aerodynamic thrust $F_{z_i}$ being exerted on each of wind turbine blades 312 as a function of a moment $\vec{M}_i$ induced on each of wind turbine blades 312. Also, the full aerodynamic thrust $F_z$ on wind turbine 300 is determined.

In addition to the predicting values for the moment $\vec{M}_i$ and aerodynamic thrust $F_{z_i}$ induced on each of wind turbine blades 312, the resultant moment $\vec{M}_r$ of wind turbine blades 312, and the full aerodynamic thrust $F_z$ on wind turbine 300, the strategies implemented within rotor imbalance control sub-systems 500 and 550 determine at least one of the hub flange resultant moment MresXY and the yaw bearing nodding moment MyYB on wind turbine 300 at least partially as a function of the determined aerodynamic thrust $F_z$. In addition, the strategies implemented within rotor imbalance control sub-systems 500 and 550 compare 608 the predicted rotor imbalance with a predetermined threshold value of the rotor imbalance.

Moreover, rotor imbalance control sub-system 500 regulates 610 at least one pitch position for at least one second rotor blade 312, i.e., at least one functioning rotor blade 312 of the plurality of rotor blades 312 such that the predicted rotor imbalance that has exceeded the predetermined threshold is restored to a value below the predetermined threshold. For wind turbine 300, with three blades 312, one or two of blades 312 may malfunction and two or one functioning blades 312 are/is used to reduce the predicted rotor imbalance to values within the parameters determined by the threshold value of the rotor imbalance. As such, wind turbine 300 is driven to a shutdown condition through regulating the functioning blades 312 through a pitch reference trajectory for the time interval determined for the shutdown, where the blade trajectories are predicted using the gradient-based strategy implemented within rotor imbalance control sub-system 500 until functioning blades 312 are placed in the feathered, or parking condition. In addition, functioning blades 312 may be pitched out with a controlled rate of change of pitch position.

Alternatively, rotor imbalance control sub-systems 500 regulates 612 at least one pitch position for at least one second rotor blade 312, i.e., at least one functioning rotor blade 312 of the plurality of rotor blades 312 such that the predicted rotor imbalance does not exceed the predetermined threshold. For wind turbine 300, with three blades 312, one or two of blades 312 may malfunction and two or one functioning blades 312 are/is used to maintain the predicted rotor imbalance within the parameters determined by the threshold value of the rotor imbalance. As such, wind turbine 300 is driven to a shutdown condition through regulating the functioning blades 312 through a pitch reference trajectory for the time interval determined for the shutdown, where the blade trajectories are predicted using the MPC strategy implemented within rotor imbalance control sub-system 550 until functioning blades 312 are placed in the feathered, or parking condition. In addition, functioning blades 312 may be pitched out with a controlled rate of change of pitch position.

FIG. 10 is an exemplary configuration 700 of a database 702 within a computing device 704, along with other related computing components, which may be used to control wind turbine 300 (shown in FIG. 3) as described herein. Database 702 is coupled to several separate components within computing device 704, which perform specific tasks. In the exemplary embodiment, computing device 704 may be computing device 105 (shown in FIG. 1). Computing device 704 is configured to interface with a human system operator 705.

In the exemplary embodiment, database 702 includes wind turbine data 706, wind turbine control system data 708, and rotor imbalance control sub-system data 710. Wind turbine data 706 includes information such as configuration data, e.g., and without exception, the number of wind turbine blades and the length of each. Wind turbine control system data 708 includes information associated with the architecture of wind turbine control system 200, such as, without limitation, closed control loop topologies and associated feedback and feed-forward branches. Rotor imbalance control sub-system data 710 includes that data associated with the MPC strategy and the gradient-based strategy as described herein.

Computing device 704 includes database 702, as well as data storage devices 712. Computing device 704 also includes a wind turbine controller component 714 for executing method step 602 (shown in FIG. 10). Computing device 704 further includes a receiving module component 716 for executing method step 604 (shown in FIG. 10), including receiving wind turbine control system data 706, e.g., without exception, blade pitch position feedback 516 (shown in FIGS. 8 and 9). In sub-system 500 (shown in FIG. 8), computing device 704 also includes a predicting module component 718 for executing method step 606 (shown in FIG. 10). Computing device 704 further includes a comparing module component 720 for executing method step 608 (shown in FIG. 10). Computing device 704 also includes a pitch control module component 722 for executing method steps 610 and 612 (shown in FIG. 10).

In sub-system 550 (shown in FIG. 9), rather than a predicting module component 718 for executing method step 606 and a comparing module component 720 for executing method step 608, sub-system 550 includes a pitch profile module component 724 (shown in phantom) for executing method steps 606 and 608.

Computing device 704 further includes a processing component 724 that assists with execution of computer-executable instructions associated with wind turbine 300 and method 600 as described herein.

The above described wind turbine control systems provide a method for inducing control of the wind turbine to significantly reduce a potential for rotor imbalance and the associated mechanical load excursions subsequent to a malfunction in a blade pitch control mechanism. Specifically, the embodiments described herein include a rotor imbalance control sub-system that facilitates predicting a rotor imbalance using a physics-based model of at least a portion of the wind turbine, comparing the predicted rotor imbalance with a predetermined threshold value, and regulating a pitch angle for the operable rotor blades such that the predicted rotor imbalance either is restored to within the parameters as soon as possible if the thresholds are exceeded, or does not exceed the predetermined threshold. More specifically, one of the embodiments described herein uses a gradient-based strategy to facilitate reducing rotor imbalances back within predetermined parameters to regulate loads that include hub flange resultant moments and tower top loads, e.g., yaw bearing nodding moments. Also, more specifically, another one of the embodiments described herein uses a model predictive control (MPC) strategy to facilitate maintaining rotor imbalances within predetermined parameters to regulate loads that include hub flange resultant moments and tower top loads, e.g., yaw bearing nodding moments. As such, the embodiments described herein reduce reliance on mechanical breaking systems to slow down the wind turbine rotor, thereby facilitating reducing wear on the mechanical breaking systems and reducing the associated increase in maintenance costs, or more robust design requirements.

The exemplary embodiments described herein use one exemplary embodiment of a gradient-based strategy and one exemplary embodiment of an MPC-based strategy. However, these are just two embodiments of physics model-based regulation of wind turbine loads. As such, any embodiments of physics-based models of wind turbine loads that enable one of preventing load parameters from exceeding parameters and restoring the loads to within parameters upon exceedance may be used.

An exemplary technical effect of the methods, systems, and apparatus described herein includes at least one of: (a) using a gradient-based strategy to model the affected wind turbine to predict a plurality of future moments and loads on the wind turbine due to a failure of at least blade to pitch correctly; (b) using the gradient-based strategy to predict the necessary blade pitch angles of the functional blades to that have exceeded the established load parameters during shutdown of the wind turbine to back within established parameters; (c) using a predictive control (MPC) strategy to predict a plurality of future moments and loads on the wind turbine due to a failure of at least blade to pitch correctly; and (d) using the MPC strategy to predict the necessary blade pitch angles of the functional blades to not exceed the established load parameters during shutdown of the wind turbine.

Exemplary embodiments of methods, systems, and apparatus for monitoring and controlling wind turbines during shutdown are not limited to the specific embodiments described herein, but rather, components of systems and/or steps of the methods may be utilized independently and separately from other components and/or steps described herein. For example, the methods may also be used in combination with other wind turbine systems requiring in-situ recognition of unusual conditions and the associated methods of predicting loads and stresses, and are not limited to practice with only the wind turbines and methods as described herein. Rather, the exemplary embodiment can be implemented and utilized in connection with many other applications, equipment, and systems that may benefit from physics-based modeling and control in an operating environment with unusual conditions.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for controlling a wind turbine, the wind turbine including a rotor, a plurality of rotor blades coupled to the rotor, and a blade pitch control system coupled to each rotor blade of the plurality of rotor blades, said method comprising:
   determining at least one pitch position for at least one first rotor blade of the plurality of rotor blades;
   determining whether there is a malfunction of a portion of the blade pitch control system associated with the at least one first rotor blade;
   predicting a rotor imbalance using a model of at least a portion of the wind turbine, wherein the rotor imbalance comprises a non-zero resultant moment of the plurality of rotor blades;
   comparing the predicted rotor imbalance with a predetermined threshold value; and
   one of:
      regulating at least one pitch position for at least one second rotor blade of the plurality of rotor blades such that the predicted rotor imbalance is restored to a value below the predetermined threshold value; and
      regulating at least one pitch position for at least one second rotor blade of the plurality of rotor blades such that the predicted rotor imbalance does not exceed the predetermined threshold value.

2. The method in accordance with claim 1, wherein regulating at least one pitch position for at least one second rotor blade comprises positioning the at least one second rotor blade in a feathered parking position.

3. The method in accordance with claim 2, wherein positioning the at least one second rotor blade in a feathered parking position comprises removing the wind turbine from service.

4. The method in accordance with claim 1 further comprising determining real-time values of at least one determined characteristic associated with at least one of the wind turbine and wind proximate to the wind turbine, wherein the at least one determined characteristic includes at least one of:
   a measured real-time pitch angle of each rotor blade of the plurality of rotor blades;
   a calculated real-time tip speed ratio of each rotor blade of the plurality of rotor blades;
   a calculated real-time effective wind velocity proximate to the wind turbine;
   a measured real-time rotor speed; and
   a measured real-time rotor position.

5. The method in accordance with claim 1, wherein regulating at least one pitch position for at least one second rotor blade comprises determining a pitch reference trajectory over a determined time interval for the at least one second rotor blade until the at least one second rotor blade is disposed in a feathered parking position.

6. The method in accordance with claim 1, wherein regulating at least one pitch position for at least one second rotor blade comprises regulating a rate of change of pitch position.

7. The method in accordance with claim 1 further comprising determining real-time values of at least one determined characteristic associated with at least one of the wind turbine and wind proximate to the wind turbine, wherein the at least one determined characteristic includes at least one of:
   a length for each rotor blade of the plurality of rotor blades;
   a calculated real-time effective wind velocity proximate to the wind turbine;
   a real-time density of air proximate to the wind turbine;
   a calculated real-time tip speed ratio for each rotor blade of the plurality of rotor blades; and
   a measured real-time pitch angle of each rotor blade of the plurality of rotor blades.

8. The method in accordance with claim 7 further comprising determining aerodynamic thrust, aerodynamic torque, and partial derivatives of the aerodynamic torque and the aerodynamic thrust based on the real-time values of at least one determined characteristic.

9. The method in accordance with claim 8 further comprising determining at least one of hub flange resultant moments and yaw bearing nodding moments at least partially as a function of the determined aerodynamic thrust.

10. The method in accordance with claim 1, wherein determining whether there is a malfunction of a portion of the blade pitch control system comprises determining whether the at least one pitch position exceeds a predetermined pitch position parameter.

11. The method in accordance with claim 10 further comprising initiating a shutdown sequence prior to determining whether the at least one pitch position exceeds a predetermined pitch position parameter.

12. A system for controlling a wind turbine, the wind turbine including a rotor and a plurality of rotor blades coupled to the rotor, said system comprising:
  a blade pitch control system coupled to the plurality of rotor blades, said blade pitch control system configured to:
    position the plurality of rotor blades based on a commanded pitch angle; and
    determine whether there is a malfunction of a portion of said blade pitch control system associated with at least one first rotor blade of the plurality of rotor blades;
    predict a rotor imbalance using a model of at least a portion of the wind turbine, wherein the rotor imbalance comprises a non-zero resultant moment of the plurality of rotor blades;
    compare the predicted rotor imbalance with a predetermined threshold value; and
  one of:
    a first model-based imbalance control sub-system coupled to said blade pitch control system, said first model-based imbalance control sub-system comprising at least one first processor configured to regulate at least one pitch position for at least one second rotor blade of the plurality of rotor blades such that the predicted rotor imbalance is restored to a value below the predetermined threshold value; and
    a second model-based imbalance control sub-system coupled to said blade pitch control system, said second model-based imbalance control sub-system comprising at least one second processor configured to regulate at least one pitch position for at least one second rotor blade of the plurality of rotor blades such that the predicted rotor imbalance does not exceed a predetermined threshold value.

13. The system in accordance with claim 12, wherein said first and second imbalance control systems are further configured to position said at least one second rotor blade in a feathered parking position.

14. The system in accordance with claim 12, wherein said system is further configured to facilitate removing the wind turbine from service.

15. The system in accordance with claim 12, wherein said first and second imbalance control systems are further configured to determine real-time values of at least one determined characteristic associated with at least one of the wind turbine and wind proximate to the wind turbine, wherein the at least one determined characteristic includes at least one of:
  a measured real-time pitch angle of said each rotor blade of the plurality of rotor blades;
  a calculated real-time tip speed ratio of said each rotor blade of the plurality of rotor blades;
  a calculated real-time effective wind velocity proximate to the wind turbine;
  a measured real-time rotor speed; and
  a measured real-time rotor position.

16. The system in accordance with claim 12, wherein said first and second imbalance control systems are further configured to determine a pitch reference trajectory over a determined time interval for the at least one second rotor blade of the plurality of rotor blades until the at least one second rotor blade is disposed in a feathered parking position.

17. The system in accordance with claim 12, wherein said first and second imbalance control systems are further configured to regulate a rate of change of pitch angle of the at least one second rotor blade of the plurality of rotor blades.

18. The system in accordance with claim 12, wherein said first and second imbalance control systems are further configured to determine at least one characteristic associated with at least one of the wind turbine and wind proximate to the wind turbine, wherein the at least one determined characteristic includes at least one of:
  a length for said each rotor blade of the plurality of rotor blades;
  a calculated real-time effective wind velocity proximate to the wind turbine;
  a real-time density of air proximate to the wind turbine;
  a calculated real-time tip speed ratio for the each rotor blade of the plurality of rotor blades; and
  a measured real-time pitch angle of the each rotor blade of the plurality of rotor blades.

19. The system in accordance with claim 18, wherein said first and second imbalance control systems are further configured to determine aerodynamic thrust, aerodynamic torque, and partial derivatives of the aerodynamic torque and the aerodynamic thrust based on the real-time values of the at least one determined characteristic.

20. The system in accordance with claim 19, wherein said first and second imbalance control systems are further configured to determine at least one of hub flange resultant moments and yaw bearing nodding moments at least partially as a function of the determined aerodynamic thrust.

21. The system in accordance with claim 12, wherein said blade pitch control system is further configured to determine whether a measured pitch angle of the at least one first rotor blade of the plurality of rotor blades exceeds a predetermined pitch angle parameter.

22. The system in accordance with claim 21, wherein said system is further configured to facilitate at least partially conducting a shutdown sequence prior to determining whether the measured pitch angle of the at least one first rotor blade of the plurality of rotor blades exceeds a predetermined pitch angle parameter.

23. A wind turbine comprising:
  a rotor;
  a plurality of rotor blades coupled to said rotor, each rotor blade of said plurality of rotor blades defines a pitch axis and configured to attain a position having a pitch angle about the pitch axis;
  a blade pitch control system coupled to said plurality of rotor blades, said blade pitch control system configured to:
    position said plurality of rotor blades based on a commanded pitch angle; and
    determine whether there is a malfunction of a portion of said blade pitch control system associated with at least one first rotor blade of said plurality of rotor blades;

predict a rotor imbalance using a model of at least a portion of the wind turbine, wherein the rotor imbalance comprises a non-zero resultant moment of the plurality of rotor blades;

compare the predicted rotor imbalance with a predetermined threshold value; and one of:
a first model-based imbalance control sub-system coupled to said blade pitch control system, said first model-based imbalance control sub-system comprising at least one first processor configured to regulate at least one pitch position for at least one second rotor blade of said plurality of rotor blades such that the predicted rotor imbalance is restored to a value below the predetermined threshold value; and a second model-based imbalance control sub-system coupled to said blade pitch control system, said second model-based imbalance control sub-system comprising at least one second processor configured to regulate at least one pitch position for at least one second rotor blade of said plurality of rotor blades such that the predicted rotor imbalance does not exceed a predetermined threshold value.

* * * * *